(12) United States Patent
Shen et al.

(10) Patent No.: US 9,648,279 B2
(45) Date of Patent: May 9, 2017

(54) METHOD AND SYSTEM FOR VIDEO COMMUNICATION

(75) Inventors: Francis Shen, Concord (CA); Paulo Francisco, Concord (CA); David Sayson, Vancouver (CA); Stephane Angelot, Frisco, TX (US); Keith Huthmacher, Wexford, PA (US); Lloyd Hucke, Wexford, PA (US)

(73) Assignee: Mitel Networks Corporation, Ottawa, Ontario (CA)

( * ) Notice: Subject to any disclaimer, the term of this patent is extended or adjusted under 35 U.S.C. 154(b) by 447 days.

(21) Appl. No.: 13/156,220

(22) Filed: Jun. 8, 2011

(65) Prior Publication Data

US 2012/0062688 A1 Mar. 15, 2012

Related U.S. Application Data

(60) Provisional application No. 61/352,695, filed on Jun. 8, 2010.

(51) Int. Cl.

| | |
|---|---|
| *H04N 7/15* | (2006.01) |
| *H04N 19/136* | (2014.01) |
| *G06F 3/0488* | (2013.01) |
| *G06F 9/44* | (2006.01) |
| *H04L 12/18* | (2006.01) |

(Continued)

(52) U.S. Cl.
CPC ........... *H04N 7/15* (2013.01); *G06F 3/04886* (2013.01); *G06F 9/4443* (2013.01); *H04L 12/18* (2013.01); *H04N 19/136* (2014.11); *G06F 3/04842* (2013.01); *G06F 2203/04803* (2013.01); *G06Q 10/107* (2013.01); *H04L 12/1827* (2013.01);

(Continued)

(58) Field of Classification Search
CPC .... G09G 5/14; G09G 2370/00; G06F 3/0481; G06F 3/0482; G06F 3/04842; G06F 3/04845; G06F 17/30899–17/30905; G06F 3/04817; G06F 3/0484; G06F 17/30867; G06F 8/34; G06F 9/443; G06F 3/0488; G06F 3/04886; G06F 2203/0483; G06F 2203/04803; H04N 21/4858; H04N 21/485; H04N 7/15; H04N 19/136; H04N 7/17; H04L 12/1813
USPC ...... 715/753–758, 764, 792, 863; 348/14.03, 348/14.08

See application file for complete search history.

(56) References Cited

U.S. PATENT DOCUMENTS 5,233,687 A * 8/1993 Henderson et al. .......... 715/804
5,594,859 A 1/1997 Palmer et al.
(Continued)

FOREIGN PATENT DOCUMENTS

| | | |
|---|---|---|
| EP | 2189889 A1 | 5/2010 |
| WO | WO 2008/031216 A1 | 3/2008 |

*Primary Examiner* — Nicholas Ulrich

(57) ABSTRACT

An apparatus and a non-transitory machine readable medium for facilitating a video communication session between correspondents. Each correspondent is associated with the apparatus having a graphical user interface (GUI). Video corresponding to at least one of the correspondents is displayed in a first partition, the video having characteristics. A plurality of applications executing concurrently during the video communication session are displayed in a second partition. GUI objects corresponding to the video communication session are displayed in a third partition. The second partition is dynamically resized to a size that depends on the characteristics of the video.

16 Claims, 33 Drawing Sheets

(51) Int. Cl.
  *G06F 3/0484* (2013.01)
  *G06Q 10/10* (2012.01)
  *H04N 7/14* (2006.01)
  *H04L 29/06* (2006.01)
  *H04L 29/08* (2006.01)

(52) U.S. Cl.
  CPC .......... *H04L 65/4038* (2013.01); *H04L 67/36* (2013.01); *H04N 7/147* (2013.01)

(56) References Cited

U.S. PATENT DOCUMENTS

| | | | |
|---|---|---|---|
| 6,329,984 B1* | 12/2001 | Boss et al. .................... | 715/723 |
| 6,456,305 B1* | 9/2002 | Qureshi et al. ............... | 715/800 |
| 6,496,201 B1* | 12/2002 | Baldwin .................. | H04N 7/15 |
| | | | 348/14.08 |
| 7,379,704 B2* | 5/2008 | Parker et al. ................. | 434/350 |
| 7,391,423 B1* | 6/2008 | Manzari et al. .............. | 345/619 |
| 7,554,571 B1* | 6/2009 | Beck et al. ................. | 348/14.07 |
| 7,568,167 B2* | 7/2009 | Van Dok et al. ............. | 715/789 |
| 7,797,632 B2* | 9/2010 | Anzelde et al. .............. | 715/273 |
| 7,865,834 B1* | 1/2011 | van Os et al. ................ | 715/756 |
| 8,201,096 B2* | 6/2012 | Robert et al. ................ | 715/767 |
| 8,253,695 B2* | 8/2012 | Ganatra et al. .............. | 345/173 |
| 8,302,026 B2* | 10/2012 | Wang et al. .................. | 715/788 |
| 8,405,706 B2* | 3/2013 | Zhang et al. ............... | 348/14.16 |
| 8,429,540 B1* | 4/2013 | Yankovich et al. ........... | 715/751 |
| 8,522,142 B2* | 8/2013 | Bhatla et al. ................. | 715/719 |
| 8,533,611 B2* | 9/2013 | Katis .................. | H04L 12/1827 |
| | | | 370/352 |
| 2001/0033296 A1* | 10/2001 | Fullerton .......... | G06F 17/30017 |
| | | | 715/730 |
| 2004/0001091 A1* | 1/2004 | Kressin ............... | H04L 12/1822 |
| | | | 715/753 |
| 2004/0165710 A1 | 8/2004 | Delhoyo et al. | |
| 2006/0107303 A1 | 5/2006 | Erhart et al. | |
| 2006/0129935 A1* | 6/2006 | Deinlein et al. ............. | 715/733 |
| 2006/0236247 A1 | 10/2006 | Morita et al. | |
| 2007/0136685 A1* | 6/2007 | Bhatla et al. ................. | 715/800 |
| 2007/0250788 A1* | 10/2007 | Rigolet ........................ | 715/788 |
| 2008/0094369 A1* | 4/2008 | Ganatra et al. .............. | 345/173 |
| 2009/0037826 A1* | 2/2009 | Bennetts .................. | H04N 7/15 |
| | | | 715/753 |
| 2009/0049385 A1* | 2/2009 | Blinnikka et al. ............ | 715/719 |
| 2009/0063972 A1* | 3/2009 | Ma .......................... | G06F 3/048 |
| | | | 715/716 |
| 2009/0083637 A1 | 3/2009 | Skakkebaek et al. | |
| 2009/0228808 A1* | 9/2009 | MacDonald ........... | G06Q 10/10 |
| | | | 715/756 |
| 2010/0037151 A1* | 2/2010 | Ackerman et al. ........... | 715/753 |
| 2010/0073454 A1 | 3/2010 | Lovhaugen et al. | |
| 2010/0192072 A1* | 7/2010 | Spataro et al. ............... | 715/753 |
| 2011/0022450 A1* | 1/2011 | Meredith ...................... | 705/14.4 |
| 2011/0115876 A1* | 5/2011 | Khot ........................ | H04N 7/15 |
| | | | 348/14.09 |
| 2011/0145753 A1* | 6/2011 | Prakash ................. | G06F 3/0481 |
| | | | 715/783 |

\* cited by examiner

Fixed Menu
[goodbye - search - select line]

Extended Menu – Page 1
[hold – transfer - add party - voice only - mic mute - speaker/headset]

Extended Menu – Page 2
[contacts – history–directory–dialpad–dnd–forward]

Extended Menu – Page 3
[saved conf - save conf - moderator – participants - conf format]

Fixed Menu
[goodbye - search -select line]

Extended Menu – Page 1
[contacts –history-directory-dialpad*-dnd-forward]

Extended Menu – Page 2
[hold* – transfer* - add party* - voice only - mic mute - speaker/headset]

Extended Menu – Page 3
[saved conf* - save conf* - moderator* – participants* - conf format *]

*These Keys are inactive and grayed out when in idle state

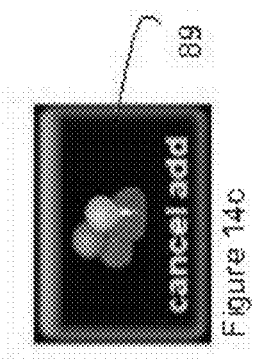
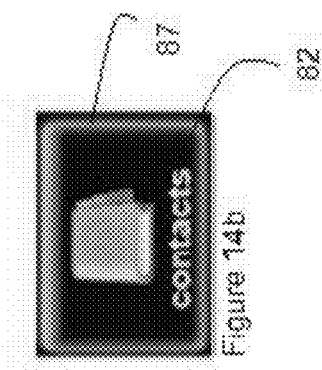
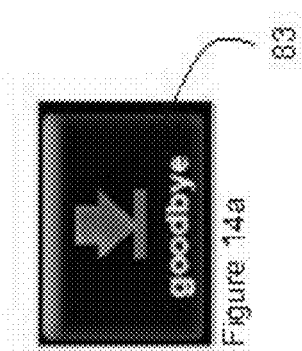

METHOD AND SYSTEM FOR VIDEO COMMUNICATION

CROSS-REFERENCE TO RELATED APPLICATIONS

This application claims the benefit of priority to U.S. Provisional Application Ser. No. 61/352,695, filed on Jun. 8, 2010.

FIELD OF THE INVENTION

The present invention relates to digital networks, and more particularly, it relates to collaboration systems.

BACKGROUND OF THE INVENTION

Videoconferencing is becoming a popular tool for real time and interactive communications for companies and individuals across time zones and locations, especially with increased safety issues, privacy issues and travel-related stress. Recent advances in networked video telephony, such as the quality of service provisions in Internet Protocol version 6 (IPv6) and H.264 video compression standards, have greatly improved the accessibility of video conferencing technology over broadband internet connections. However, despite such advances, great distances are still very frequently travelled, mainly in the business world, in order to have a more personal contact, as video conferencing equipment is generally considered to be expensive to purchase and operate, and are also associated with unsatisfactory quality.

It is thus an object of the present invention to mitigate or obviate at least one of the above-mentioned disadvantages.

SUMMARY OF THE INVENTION

In one of its aspects, there is provided an apparatus for facilitating a video communication session between at least two correspondents, each correspondent being associated with said apparatus having a graphical user interface (GUI) comprising a first partition for displaying video content corresponding to at least one of said correspondents; a second partition for displaying a first set of GUI objects associated with application programs; and a third partition for displaying GUI objects corresponding to said video communication session.

In another of its aspects, there is provided a non-transitory machine readable medium comprising instructions executable by a processor to cause said processor to: initiate a video communication session between at least two correspondents, each correspondent being associated with an apparatus with a graphical user interface (GUI); display video content corresponding to said at least one of said correspondents in a first scalable partition; display a first set of GUI objects associated with application programs in a second scalable partition; and display a second set of GUI objects corresponding to said video communication session in a third partition being scalable.

In another of its aspects, there is provided a graphical user interface (GUI) comprising: a first scalable partition displaying video content corresponding to at least one correspondent in a communication session; a second scalable partition displaying a first set of GUI objects associated with application programs; and a third partition for displaying a second set of GUI objects corresponding to said communication session.

In another of its aspects, there is provided a network apparatus in a collaboration system with a plurality of participants, the apparatus comprising a processing structure and a non-transitory machine readable medium having instructions stored thereon, said instruction executable by said processing structure to cause said processing structure to at least: automatically discover a network server configured to distribute shared content among said plurality of participants; couple said apparatus to said network server; present content on a display coupled to said processing structure; select a portion of said display for sharing, said portion having said shared content; and automatically send said shared content to at least one of said plurality of participants.

In another of its aspects, there is provided a non-transitory machine-readable medium comprising coded instructions stored thereon, said instructions executable by a processing structure, said coded instructions comprising: (a) a first set of instructions coded to determine the availability of a video application server in a collaboration system; (b) a second set of instructions coded to couple a computing device to said video application server, said first set of instructions having at least a network address of said video application server, or having the ability to discover said address through a network service; (c) a third set of instructions coded to select an entire display or a portion of a display of said computing for sharing via said video application server, said portion of display having shared content; (d) a fourth set of instructions coded to send said shared content periodically, without further user intervention; and (e) a fifth set of instructions coded to send said shared content to said video application server for distributing to at least one of said participants.

In another of its aspects, there is provided a system for automatically scheduling a conference call session between at least two correspondents, said system comprising: a directory server including entries associated with said correspondents; a non-transitory machine readable medium having instructions executable by a processor to extract conference call scheduling details, said details including date and time; executable instructions to search said directory server for said entries; executable instructions to determine at least one date and time for said conference call suitable to said correspondents; and whereby said conference call session is scheduled in an expeditious manner.

In another of its aspects, there is provided a method of determining the conditions of a communication medium between a first correspondent and a second correspondent, said method including the steps of: monitoring said communication medium between said first correspondent and said second correspondent; capturing at least one image of said first correspondent from at least one video frame received by said second correspondent, said captured image being representative of the effects of said communication medium on said video from said first correspondent; storing said captured image; transmitting said captured image to said first correspondent; comparing said captured image to a self-view image at said first correspondent, wherein said self-view image is not subject to said communication medium conditions between said first correspondent and said second correspondent; and wherein said first correspondent is presented with a copy of said captured image.

In another of its aspects, there is provided a non-transitory computer readable medium comprising instructions stored thereon for determining the conditions of a communications medium between a first correspondent and a second correspondent, said instructions executable by a processor to cause said processor to perform the steps of: monitoring said communication medium between said first correspondent and said second correspondent; capturing at least one image of said first correspondent from at least one video frame received by said second correspondent, said captured image being representative of the effects of said communication medium on said video from said first correspondent; storing said captured image; transmitting said captured image to said first correspondent; comparing said captured image to a self-view image at said first correspondent, wherein said self-view image is not subject to said communication medium conditions between said first correspondent and said second correspondent, and wherein said first correspondent is presented with a copy of said captured image.

Advantageously, there is provided a video conferencing system comprising a videophone terminal that is reliable, easy to use, intuitive, as second nature as a typical desktop telephone but with the added functionality of a smartphone, thus negligible training is required for the majority of users. The videophone terminal also includes the functionality of a typical SIP endpoint, and provides enabling seamless, natural communication between the at least two parties.

In addition, there is provided increased benefits to enterprises by providing an application store with only IT department-approved applications which provides for enhanced security, support, network device audits, and a more consistent user experience. Alternatively, the applications are accessed via a suitable "browser" on the videophone while the software and data are stored on remote servers, as a cloud service. Enterprise-related communications, such as, videos, newsletters, business reports, announcements, alerts, may be pushed to the videophones, including peer-to-peer sharing of documents and multimedia content across the network, thus enhancing enterprise-wide communications and collaboration.

BRIEF DESCRIPTION OF THE DRAWINGS

Several preferred embodiments of the present invention will now be described, by way of example only, with reference to the appended drawings in which:

FIGS. 14a to 14c depict dynamic graphical icons;

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may also be described herein in terms of screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, assembler, PERL, extensible markup language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like.

Figure 1:
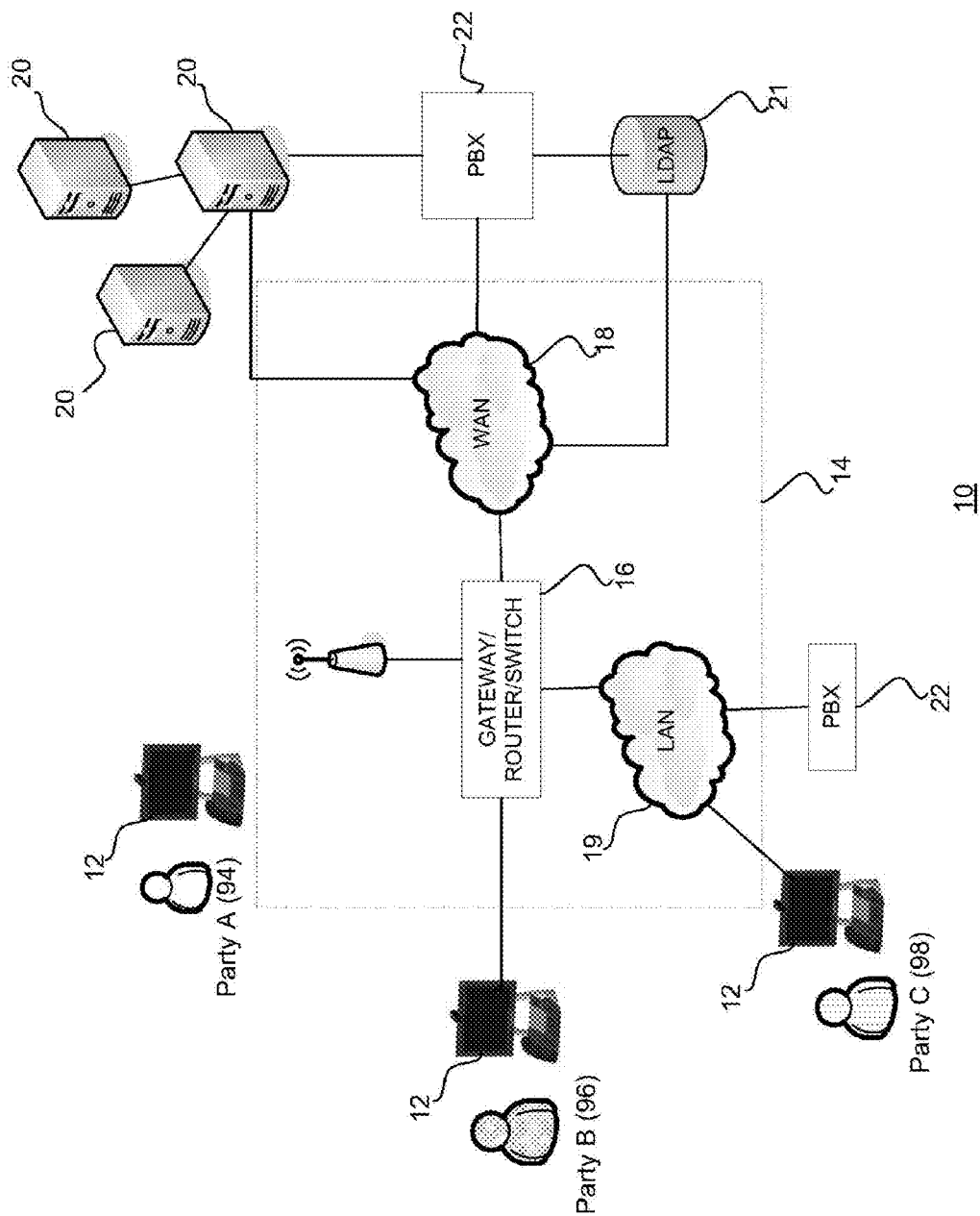
FIG. 1 depicts a communication system, in an exemplary embodiment.

FIG. 1 is a block diagram of an exemplary videophone terminal operating environment or system 10. The exemplary videophone terminal 12 communicates over one or more wired and/or wireless networks 14, via an access point 16, such as a SIP gateway, router, switch, or an 802.11g wireless access point coupled to the wide area network 18, or local area network 19. As an example, correspondent A 94, correspondent B 96 and correspondent C 98 may exchange voice, video and data via their respective devices 12 coupled to the network 14. For instance, correspondent A 94 may place and receive phone calls via the videophone terminal 12, using appropriate protocols, such as, VoIP protocols, send and receive e-mail messages (e.g., using POP3 protocol), and retrieve electronic documents and/or streams, such as web pages, photographs, and videos, over the network 14, gateway 16, and wide area network 18, using appropriate protocols, such as, TCP/IP or UDP protocols. The system 10 may include other network nodes comprising servers 20, such as a video application server (VAS), a video-on-demand media streaming server, a data server or a device configuration server, databases 21 or Lightweight Directory Access Protocol (LDAP) servers and PBX 22. In more detail, the network 14 may be characterised as a series of network nodes 12, 20, 21, 22 interconnected by network devices 16 and wired and/or wireless communication lines (such as, public carrier lines, private lines, satellite lines, etc.) that enable the network nodes 12, 20, 21, 22 to communicate. The transfer of data between network nodes 12, 20, 21, 22, 23 is facilitated by network devices 16, such as routers, switches, multiplexers, bridges, gateways, etc., that can manipulate and/or route data from an originating node 12, for example, to a server node 20, for example, regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network 14.

The databases 21 may be stored on a non-volatile storage medium or a device known to those of ordinary skill in the art, such as, compact disk (CD), digital video disk (DVD), magnetic disk, internal hard drive, external hard drive, random access memory (RAM), redundant array of independent disks (RAID), or removable memory device. As shown in FIG. 1, the databases 21 and servers 20 may be located remotely from the videophone terminal 12. In some embodiments, however, the databases 21, or portions thereof, may be located locally on the videophone terminal 12 or servers 20 and/or may be integrated with the videophone terminal 12 or servers 20, or other network nodes, respectively. Generally, databases 21 may include distributed databases, and may include different types of data content and/or different formats for stored data content, such as tables and/or other types of data structures.

Figure 2:
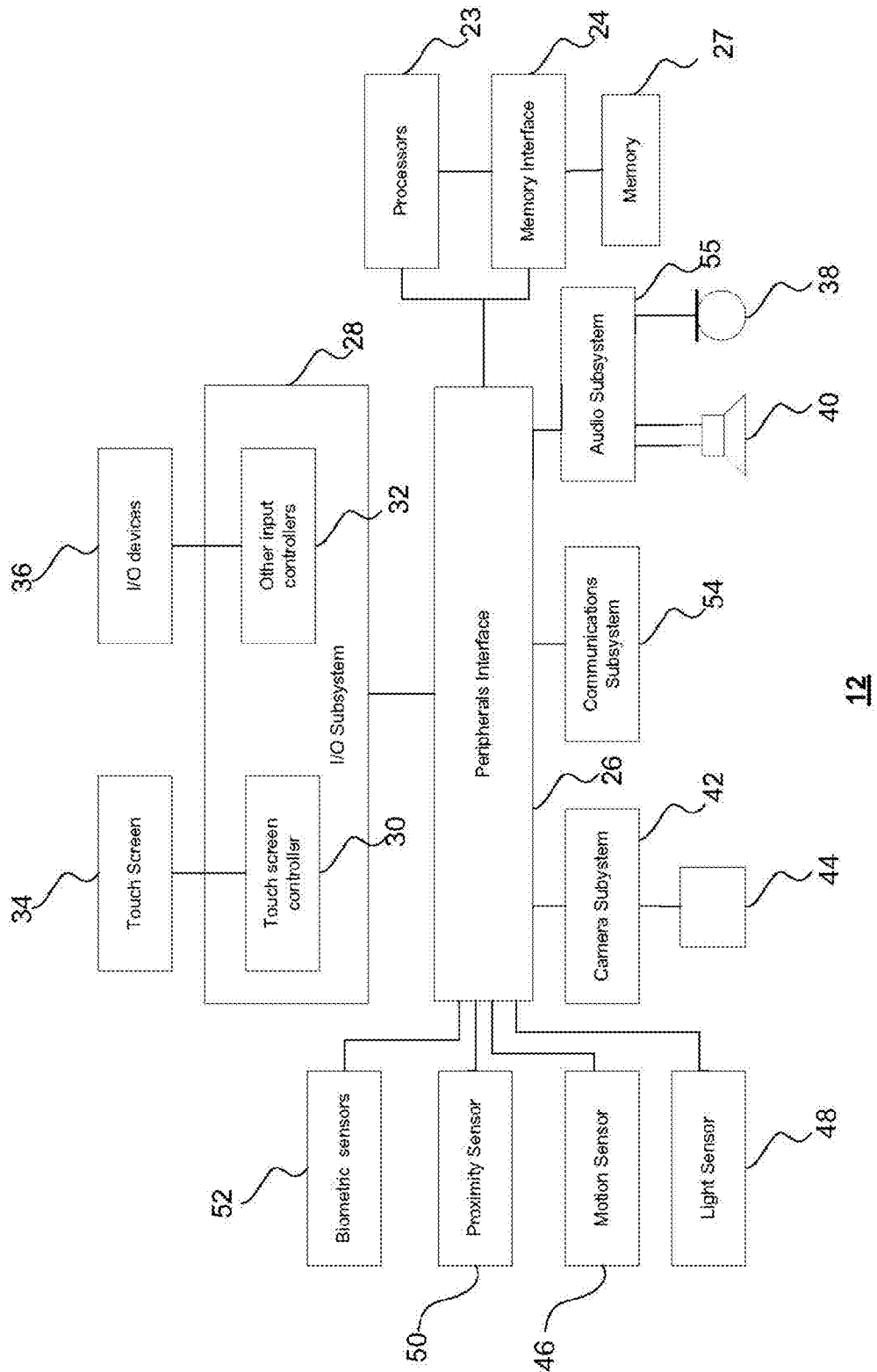
FIG. 2 is a block diagram of an example implementation of the videophone terminal of FIG. 1.

FIG. 2 is a block diagram of an exemplary implementation of the videophone terminal 12 of FIG. 1. The videophone terminal 12 can include one or more data processors, image processors and/or central processing units 23, a memory interface 24, and a peripherals interface 26. The memory interface 24, the one or more processors 23 and/or the peripherals interface 26 may be separate components or may be integrated in one or more integrated circuits. The various components in the videophone terminal 12 may be coupled by one or more communication buses or signal lines. Suitable processors 23 for the execution of a program of instructions include, by way of example, both general and special purpose microprocessors, and the sole processor or one of multiple processors or cores. Generally, a processor 23 receives instructions and data from the read-only memory or a random access memory 27 or both, via the memory interface 24. The memory 27 can include high-speed random access memory and/or non-volatile memory, such as mass storage devices for storing data files, such as magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor 23 and the memory 27 may be supplemented by, or incorporated in, ASICs (application-specific integrated circuits).

The memory 27 can store an operating system 58, such as LINUX™, UNIX™, OS X™, WINDOWS,™ or an embedded operating system. The operating system may include instructions for handling basic system services and for performing hardware dependent tasks. The memory 27 may also store communication instructions to facilitate communicating with one or more additional devices, one or more computers and/or one or more servers 20. The memory 27 may include instructions for facilitating graphic user interface processing, sensor-related processing and functions, phone-related processes and functions; electronic-messaging related processes and functions; web browsing-related processes and functions; media (video, audio) processing-related processes and functions; camera-related processes and functions; and/or other icon process instructions. Each of these instructions and applications can correspond to a set of instructions for performing one or more functions described above. These instructions need not be implemented as separate software programs, procedures or modules; and the various functions of the videophone terminal 12 may be implemented in hardware and/or in software, including in one or more signal processing and/or application specific integrated circuits. In one exemplary embodiment, the device 12 includes system applications, such as core applications that are integrated and shipped with the device 12, and user defined applications. As such, the device 12 also includes an API and SDK to promote customization, and to create an ecosystem of application developers (users, system integrators).

The videophone terminal 12 also includes the I/O subsystem 28 comprising a touch screen controller 30 and/or other input controller(s) 32. The touch-screen controller 30 may be coupled to a touch screen 34 to detect contact and movement or break thereof using any of a plurality of touch sensitivity technologies, including but not limited to capacitive, resistive, infrared, and surface acoustic wave technologies, as well as other proximity sensor arrays or other elements for determining at least one point of contact with the touch screen 34. The touch screen 34 is thus an input device that is sensitive to a user's touch, allowing a user to interact with the graphical user interface (GUI) display 70 on the screen 34. As such, the GUI display 70 may be used to implement virtual or soft buttons and/or a keyboard 110*a*, as will be described later. The user, correspondent A 94, may be able to customize a functionality of one or more of the buttons.

Correspondent A 94 can thus interact with the video phone terminal 12 by using a graphical and/or other user interface 70, and entering commands via an input device, such as the touch sensitive screen 34. Typically, each correspondent A, B, or C, has user data which includes user identifiers, user location data, user account data, and user data files, which may be stored on one more servers 20. User identifiers include data identifying the name and login information of each user of system 10. Usually, the login information includes a user identifier and associated authorization information for accessing system 10. The user identifier can include a numeric, an alphabetic, or an alphanumeric identifier, such as a username and/or an email address, including regular/postal (i.e., non-electronic) mail addresses, and telephone numbers (e.g., cellular telephone numbers and landline telephone numbers), IP addresses, SIP addresses, and network addresses. The authorization information can include a password or passphrase and/or one or more types of biometric data unique to the use, as will be described later.

The other input controller(s) 32 may be coupled to other input/control devices 36, such as one or more buttons, an infrared port, or USB ports. The one or more buttons can include an up/down button for volume control of the speaker 40 and/or the microphone 38. With continuing reference to FIG. 2, there is shown a video processing subsystem 42 for image capture and processing of full motion video, supporting a charged coupled device (CCD) or a complementary metal-oxide semiconductor (CMOS) optical sensors in camera 44, with a back-end system including integrated digital-to-analog converters (DACs), associated codecs and various algorithms. In order to provide improved video performance, in one exemplary embodiment the optical sensor includes a high-definition camera 44 (720p, maximum resolution: 1280×720 pixels), 30 frames/second) with a 70 degree field of view, and employing at least one video compression/decompression algorithm, such as a H.264 codec. In one exemplary embodiment, the video processing subsystem 42 is capable of transcoding changing resolutions, encoding schemes and data rates in real time, in order to accommodate video sources of different types, or accommodating video steams from other nodes 12, 16, 20 or 22, despite constraints of available bandwidth.

Other input devices may include sensors, devices and subsystems coupled to the peripherals interface 26 to facilitate a plurality of functionalities. For example, a motion sensor 46, a light sensor 48, and a proximity sensor 50 may be coupled to the peripherals interface 26 to facilitate lighting and proximity functions, whereas, the motion sensor 46 and/or proximity sensor 50 may be used to determine physical presence of the user, correspondent A 94, with respect to the videophone terminal 12. As such, the physical presence of the user, correspondent A 94, may be communicated to an LDAP directory or the other users' contact list and displayed as a physical presence indicator on the display 70. Another user, correspondent B 96, noticing that correspondent A 94 is physically present in the office may place a video call to correspondent A 94, thus eliminating blind-dialling. As previously indicated, other sensors can also be connected to the peripherals interface 26, such as a biometric sensor 52, or other sensing devices, to facilitate easy, fast and secure access to the system 10 via the always-on videophone terminal 12. In one exemplary embodiment, fingerprint recognition is used for access control, such that biometric fingerprint data may be stored in the memory 27 of the videophone terminal 12 (standalone support) or on the server 20 (server support). As such, the need for password authentication is eliminated, and so it the possibility of unauthorized access to the system 10 due to compromised passwords. Other biometric sensors 52 may include speech, palm, face recognition, including iris scanning.

Communication functions may be facilitated through one or more wired or wireless communication subsystems 54, which can include transceivers, network interface cards, radio frequency receivers and transmitters and/or optical (e.g., infrared) receivers and transmitters. The specific design and implementation of the communication subsystem 54 can depend on the communication network 14 over which the videophone terminal 12 is intended to operate. For example, the videophone terminal 12 may include communication subsystems 54 designed to operate over an Ethernet network, Wi-Fi network, WiMax network, and/or a Bluetooth™ network.

In order to facilitate voice-enabled functions, such as voice/speech recognition, voice replication, digital recording, and telephony function, an audio subsystem 55, embodied as hardware and/or software, such as a DSP ASIC, digitizes analog audio signals received from microphone 38 and controls the compression of the uncompressed audio and stores the resulting compressed audio back in memory 23 or DSP memory, and formats the compressed audio format for transmission, and subsequent output on a speakerphone 40. In one exemplary embodiment, the audio subsystem 54 includes a speech recognition engine as an embedded solution for a basic command set and compatible with a more capable server solution via application API/SDK. The audio subsystem 54 thus provides improved audio performance over the prior art systems, and in one exemplary embodiment supports various audio codecs, such as, G.719, while other 20 kHz capable codecs may be empoloyed. The audio subsystem 54 may also include a microphone steerable array 38, with improved signal to noise via noise rejection, which helps to determine the location of a speaker, correspondent A 94. Such feedback from the microphone steerable array 38 is input into the processor 23 which causes the camera 44 via programmed instructions to pan, tilt, or zoom, or focus, in order to accurately capture the video of the user, such as, correspondent A 94.

Typically, the speech/speech recognition capabilities also provide hands-free capabilities, with an automatic trigger speech recognition the speech recognition engine is speaker independent, with natural language with keyword extraction, multiple languages support, with a high command success rate. An exemplary speech recognition engine includes speech recognition based on the Hidden Markov Model (HHM), which is a statistical model used to recognize phonemes and match a predetermined vocabulary or a limited set of commands. For example, in an idle state, exemplary commands may include:

"Help",
"Login", "Logoff"
"Call xxx",
"Launch yyy" to launch an application,
"Search zzz" for a global lookup,
"Logout", "Shutdown".

Other exemplary commands available for incoming call may include:

"Answer",
"Decline", "Reject", "Voicemail",

Other exemplary commands available during a call may include:

"Transfer to xxx"
"Hold"
"Invite xxx"
"Hide video", "Hide me"
"Mirror".

Figure 3:
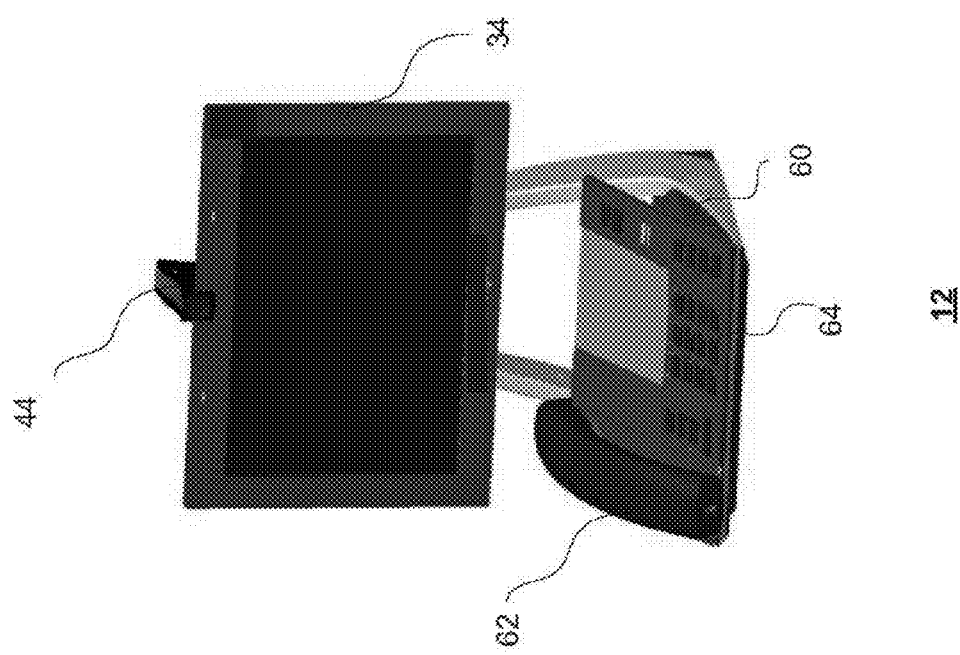
FIG. 3 depicts an exemplary videophone terminal.

As shown in FIG. 3, an exemplary videophone terminal 12 includes a 12 inch, 720p (HD) TFT display 34, a telephone "like" base 60 with a dedicated handset 62 and a basic keypad 64. The videophone terminal 12 may act in two modes, as a standalone SIP endpoint or as a component of a video system solution. As such, the videophone terminal 12 is a SIP compliant telephony device with similar functionality and interoperability to a typical SIP device, hosted by a SIP Call Manager compliant with video codec signalling. For example, the videophone terminal 12 may include the SIP stack implemented in the 675Xi/39i family of phones, from Aastra Technologies Limited, Ontario, Canada, and thus inherits the feature capabilities and interoperability of that family. The videophone 12 thus supports configuration files and language packs, standard deployment and global language support, native 3-way conference calling with video, NAT traversal via SBC and STUN.

In more detail, the supported SIP basic features may include, but are not limited to, forward & transfer, logs (dialed, missed, received), personal address book, calling name and call waiting, conferencing (3-way), DND, hold, live dialpad, multiple call appearances, mute, speed dial or favorites. Also supported are extended features, such as, handset, headset, speakerphone, factory reset capability, import/export of phone directories, language packs, UTF8 character support (multi-language), FTP, HTTP, HTTPS support for config files, static IP, dynamic IP, NTP, SIP over UDP and TCP, URL dialing, NAT traversal via STUN and SBC, TLS, 802.1p (QoS) and 802.1Q (VLAN Tagging), G711u/a, G722, G722.1 and G728. Further supported features may include: BLF List (Broadsoft) implementation, subscribe/notify (Asterisk™) implementation, Directed Call Pickup, SRTP (media encryption), TLS (signalling encryption), call hold, reminder tones for calling party, customizable, ring tones, macros, soft keys, favorites, XML support, support for different account/outbound proxy per line, bridged line appearance (BLA), hospitality features (enable/disable lists, directory, etc.), web server interface, universal plug and play (uPNP), encrypted config file support (using HTTPS), DNS SRV Records.

As a component of a video system solution, in one exemplary embodiment, the videophone terminal 12 operates in conjunction with a video application server 20 which provides dynamic bandwidth allocation, and allows up to a 100-way conference call, including a moderator function and simultaneous dial of all conference participants. The video application server 20 also provides integrated video conferencing (including ad-hoc conferences) and manages video collaboration solutions (docshare/appshare), MS Live Meeting licenses & "room", distributes docshare content to participants. The video application server 20 also supports a video mixer function which collects video from one source and distributes to many destinations (multi-unicast) in conferences having at least five participants. The videophone terminal 12 also includes H.323 interoperability through integrated SIP to H.323 Gateway and GNU GateKeeper, H.320 (ISDN) Interoperability through a third-party.

As stated above, the GUI display 70 is a touch-sensitive to provide both an input interface and an output interface between the device 12 and a user. The GUI 70 may include GUI objects, as used herein, the term "GUI object" is a generic term for a part of a GUI 70 that allows the user to interface with a program application and/or operating system. GUI objects display information and support user interaction with the GUI 70. Examples of GUI objects include buttons, dialog boxes, pop-up windows, pull-down menus, icons, scroll bars, resizable window edges, progress indicators, selection boxes, windows, tear-off menus, menu bars, toggle switches, forms, including images, text, video, widgets, and any combination thereof (collectively termed "graphics"), and other GUI objects that will occur to those of skill in the art.

Figure 4:
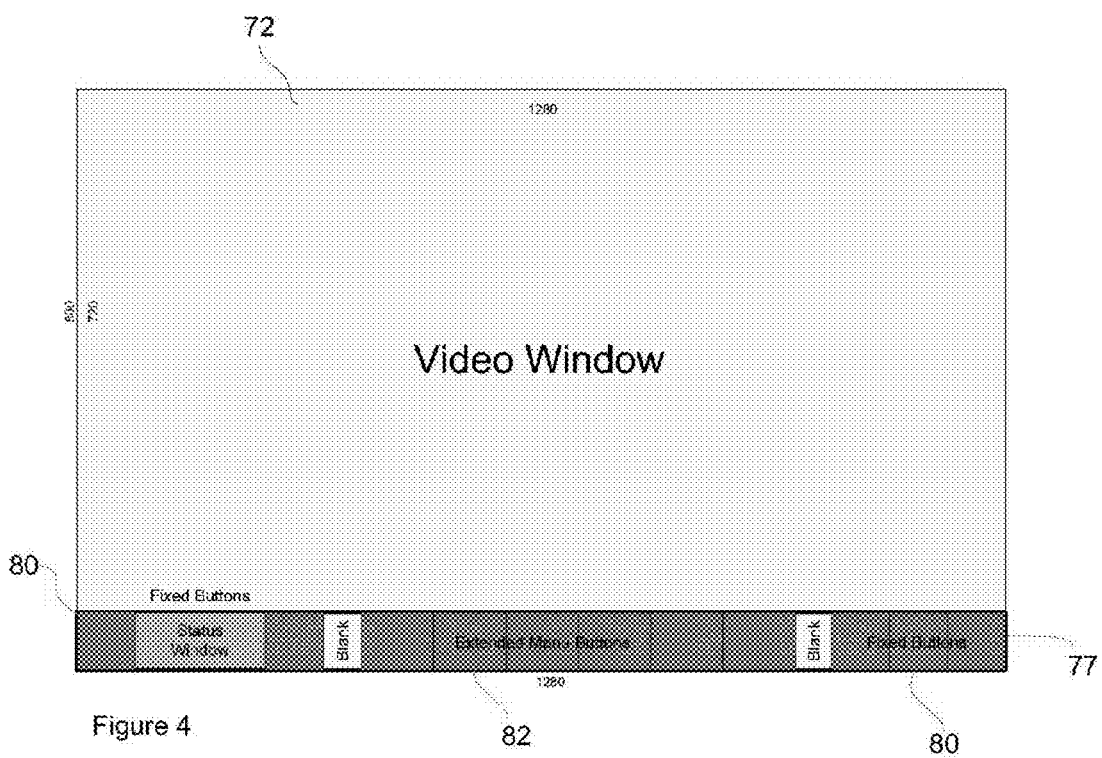
FIG. 4 depicts an exemplary layout of GUI objects on a display.
Figure 5:
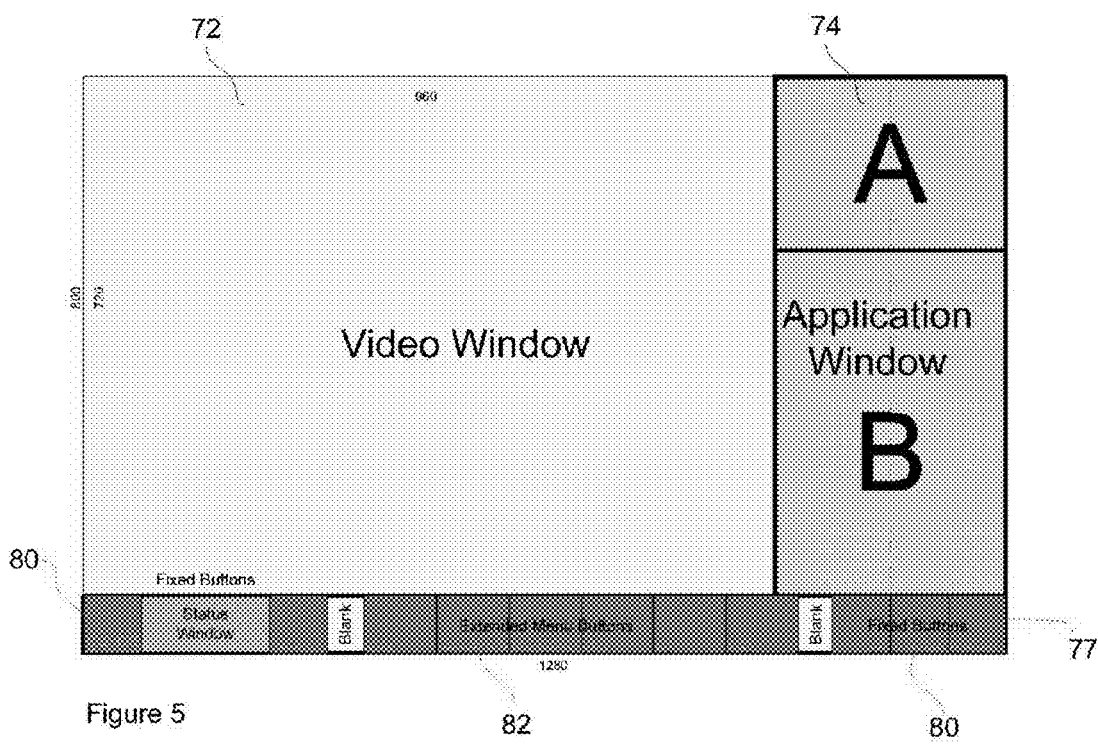
FIG. 5 depicts another exemplary layout of GUI objects on a display.
Figure 6:
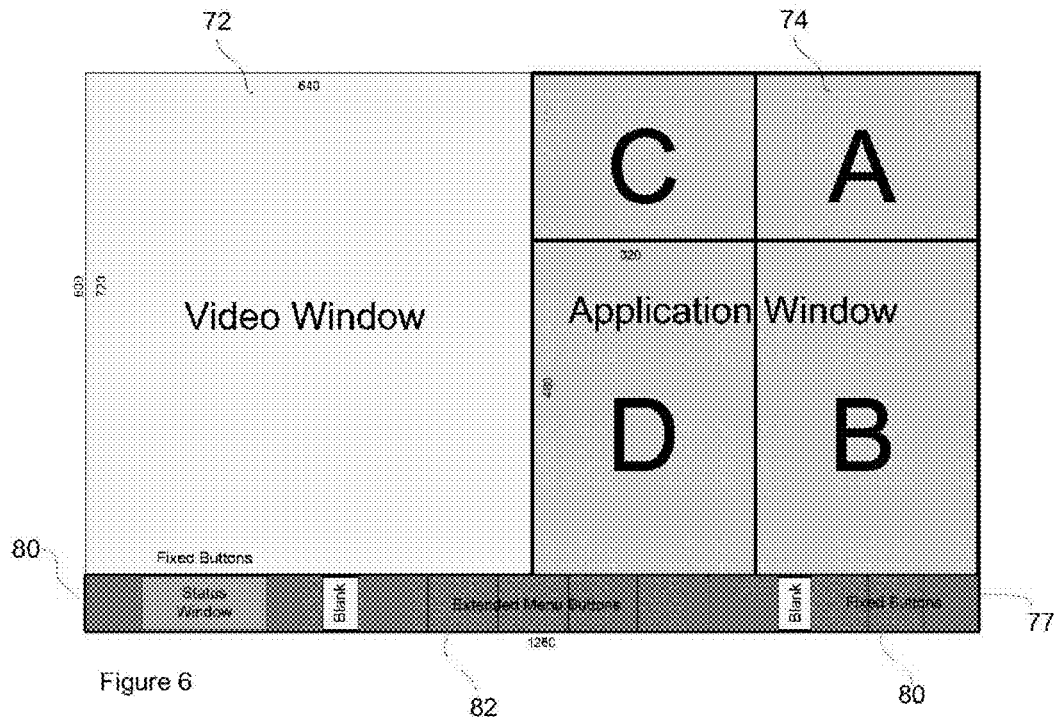
FIG. 6 depicts another exemplary layout of GUI objects on a display.
Figure 7:
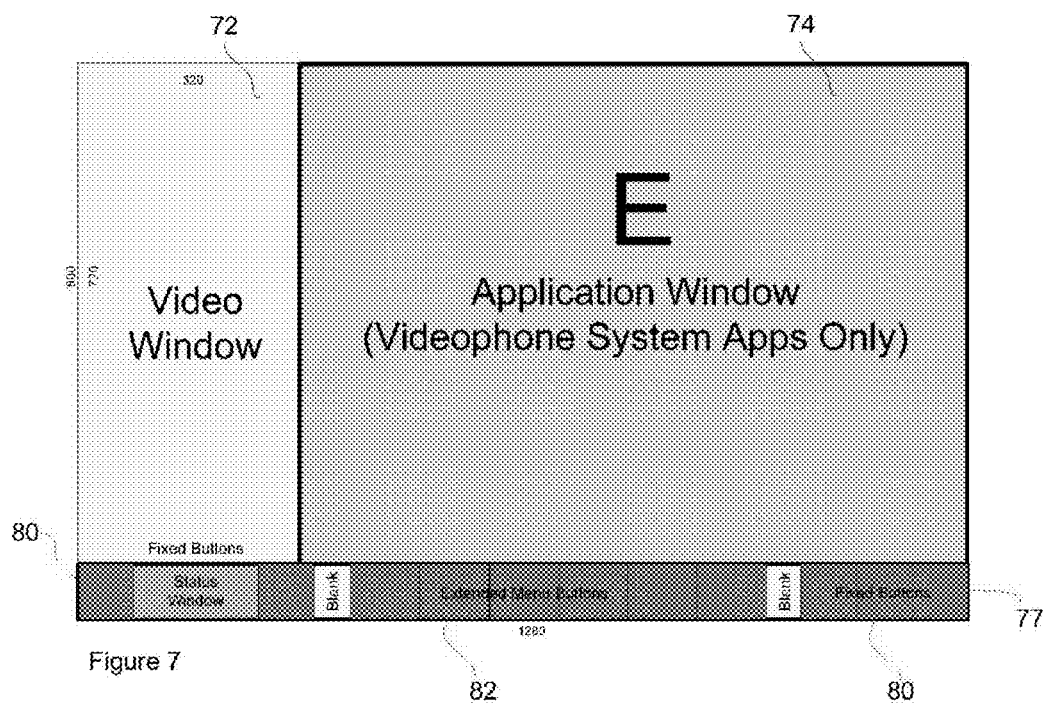
FIG. 7 depicts another exemplary layout of GUI objects on a display.

The GUI 70 real estate is divided into a number of partitions, with each partition being assigned specific functionality, such as displaying conference video or application programs. In more detail, starting with FIG. 4, there is shown a video window 72 dimensioned at 1280×720 pixels (16:9 aspect ratio), representing full-high-definition (HD), full-screen, with a toolbar 77 comprising buttons corresponding to video phone telephony, such as fixed menu buttons 80 and extended menu buttons 82. The toolbar 77 is dimensioned at 1280×80 pixels, such that the entire GUI display 70 measures 1280×800 pixels. FIG. 5 shows a video window 72 dimensioned at 960×720 pixels (i.e. ¾ of the GUI display 70), and an application window at 320×720 pixels (i.e. ¼ of the GUI display 70). In one exemplary embodiment, one application runs in the 320×240 pixel sub-application window (A), while another application runs in the 320×480 pixel sub-application window B. FIG. 6 shows a video window 72 dimensioned at 640×720 pixels (i.e. ½ of the GUI display 70), and an application window at 640×720 pixels (i.e. ½ of the display 70). In one exemplary embodiment, four application programs run concurrently in sub-application windows A to D, with sub-application windows A and C dimensioned at 320×240 pixels, and sub-application windows B and D dimensioned at 320×480 pixels. FIG. 7 shows a video window 72 dimensioned at 320×720 pixels (i.e. ¼ of the GUI display 70), and an application window at 960×720 pixels (i.e. ¾ of the GUI display 70). In this exemplary embodiment, the application window 74 (E) is dedicated to running videophone system applications only. The partitions 72, 74 are thus dynamic, and the size may depend on the nature of the video, document, conference call, or running application, however, controls via GUI objects or predetermined touch gestures may cause the scaling, such as, a 'single tap' for expanding and a 'double tap' for, as interpreted by the touch screen controller 32.

Figure 8:
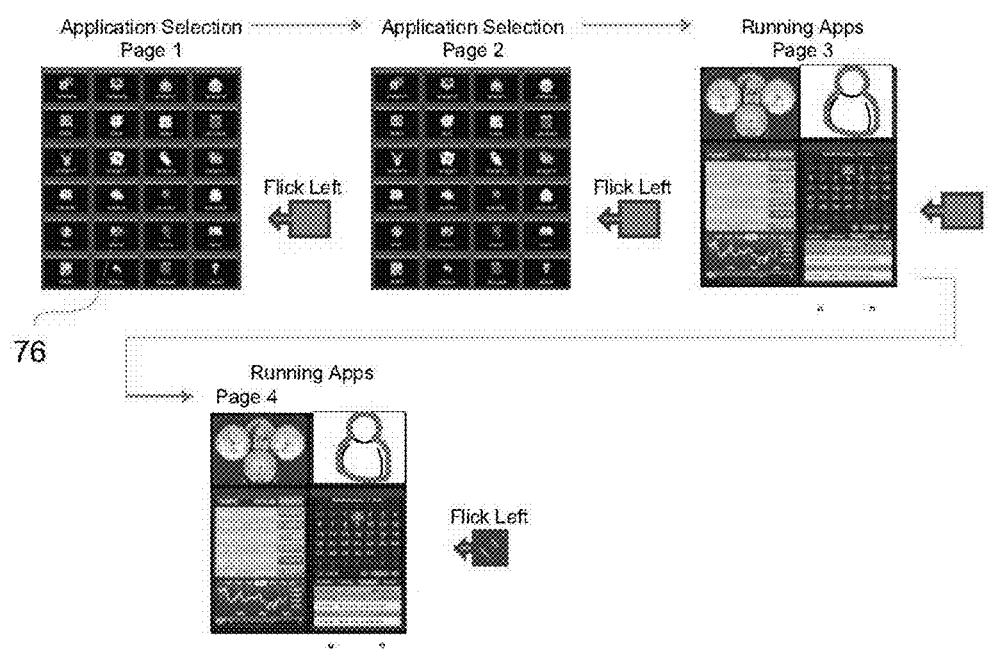
FIG. 8 depicts navigation via touch gestures.

As shown in FIG. 8, the application window 74 includes a plurality of graphical icons 76 corresponding to available application programs or widgets associated with the device 12. Alternatively, alphanumeric characters may be used to identify the application programs. Although only one page with icons is depicted, there may be ensuing pages with additional icons 76. Preferably, the icons 76 are grouped into different logical themes, which are fully customizable, depending on the user's preferences (beginner/expert user), or as dictated by the system 10 administrator. In one embodiment, the application portion 74 (640×720 pixels) is divided into a grid of 4×6 cells, with each cell or button 76 dimensioned at 160×120 pixels. As used herein, widgets (or widget modules) are mini-applications that may be downloaded from a server 20, and used by a user, and each widget typically includes its own configuration mode. In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g. Yahoo! Widgets). In some embodiments, the widget is a mini-application written in a compiled language, such as, C, C++, or Objective-C). The applications are stored locally in memory 27 and are caused to run locally via executable instructions in conjunction with the processors 23, with some, or all, data being stored locally in memory 27 or servers 20. However, the applications and associated data may be stored on remote servers 20, as a cloud service, such that the applications are via a suitable "browser" or interface on the videophone terminal 12. In either hosting situation, the available applications permissible to run on the videophone terminal 12 may be tightly controlled by the hosting service provider or the enterprise, which provides for enhanced security, support, hot-desking and network device audits. Alternatively, the applications available on the videophone terminal 12 may be integrated with applications on other devices, such as mobile phones.

Once again looking at FIG. 8, in the event that more than two pages of applications, then the user may be prompted to view the other page(s) of applications by horizontally oriented finger flicks in order to navigate through the different available pages, from which the user may select at least one application to run. With the desired applications selected, using a touch gestures or GUI control, the user can cause these applications to run and be displayed in the applications partition 74. For instance, if four applications are chosen to run, then these applications run concurrently in their respective sub-windows A to D, as stated above. Alternatively, the GUI display 70 may include any suitable alerting means to indicate additional applications pages, such as a "more apps" button, or an appropriately placed and highly visible symbol, such as a blinking "+" symbol. On each page a user may select one or more applications to run, and with the desired applications having been selected the user can cause the applications to run and be displayed in the application partition 74 via an appropriate finger-flick gesture, or GUI controls.

Figure 9:
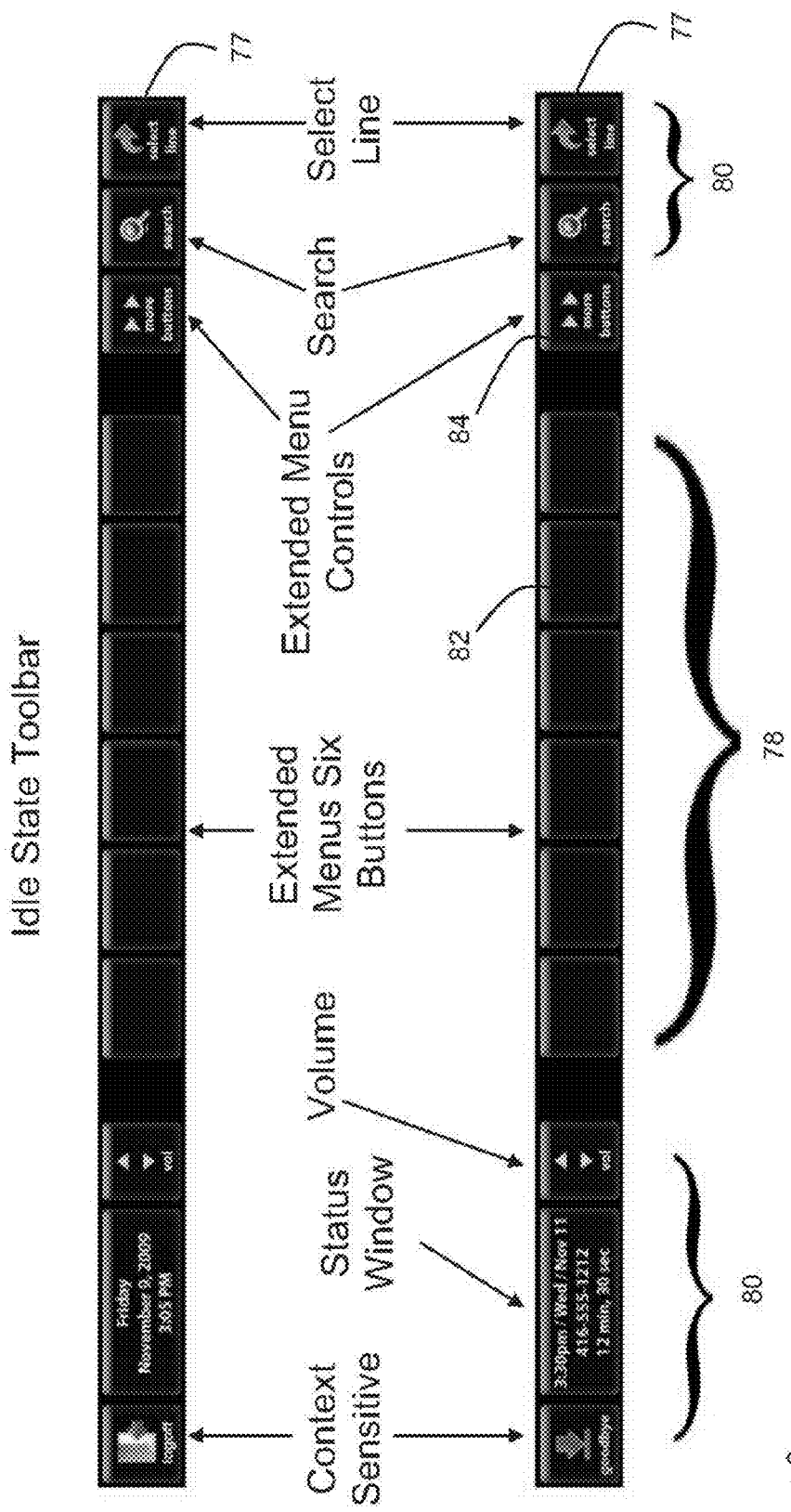
FIG. 9 depicts an idle state bar and an active calls state bar on an exemplary GUI display.
Figure 10A:
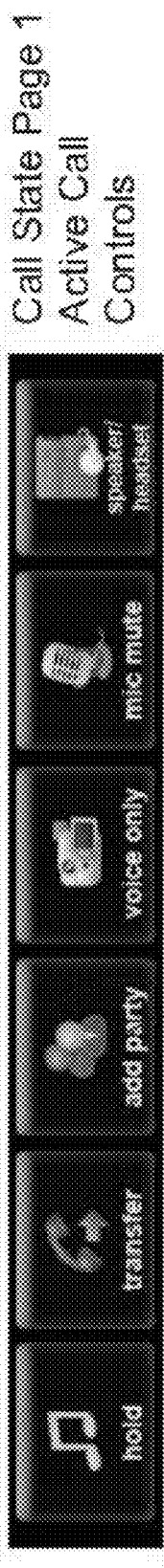
FIG. 10a depicts a plurality of exemplary call controls for one call state.
Figure 10B:
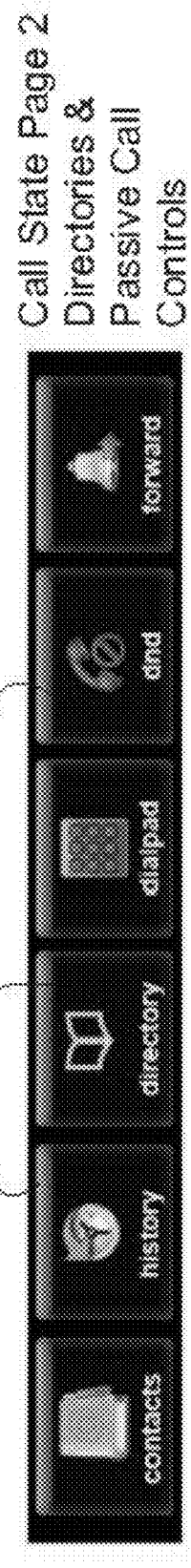
FIG. 10b depicts a plurality of exemplary call controls for another call state.
Figure 10C:
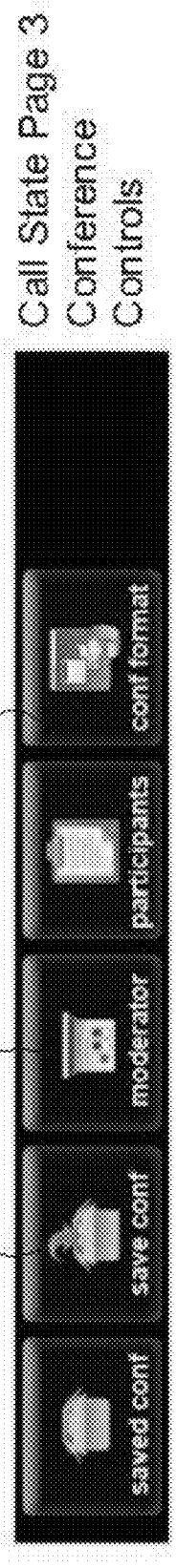
FIG. 10c depicts a plurality of exemplary call controls for yet another call state.
Figure 11A:
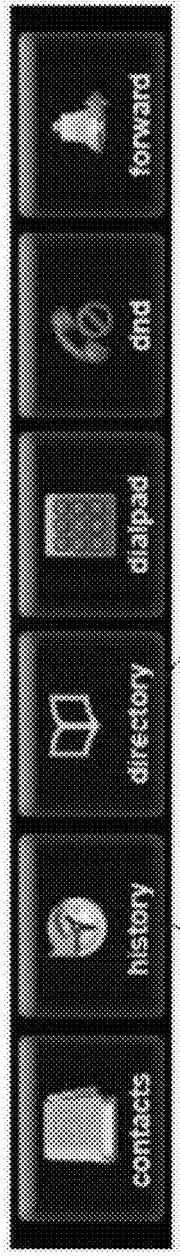
FIG. 11a depicts a plurality of exemplary call controls for on idle state.
Figure 11B:
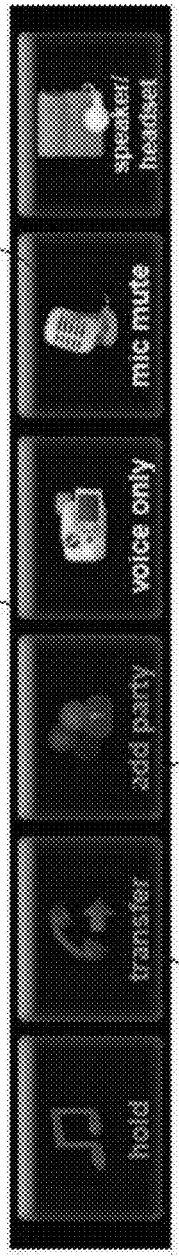
FIG. 11b depicts a plurality of exemplary call controls for another idle state.
Figure 11C:
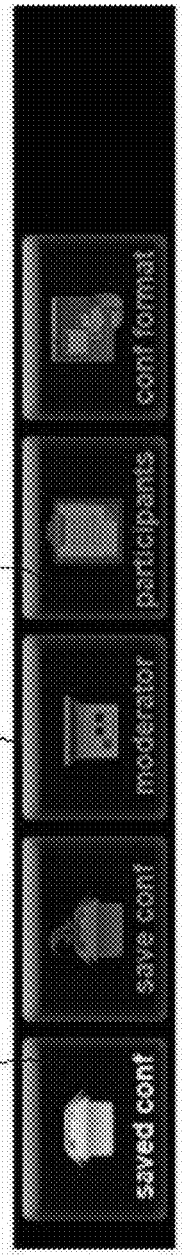
FIG. 11c depicts a plurality of exemplary call controls for yet another idle state.
Figure 12A:
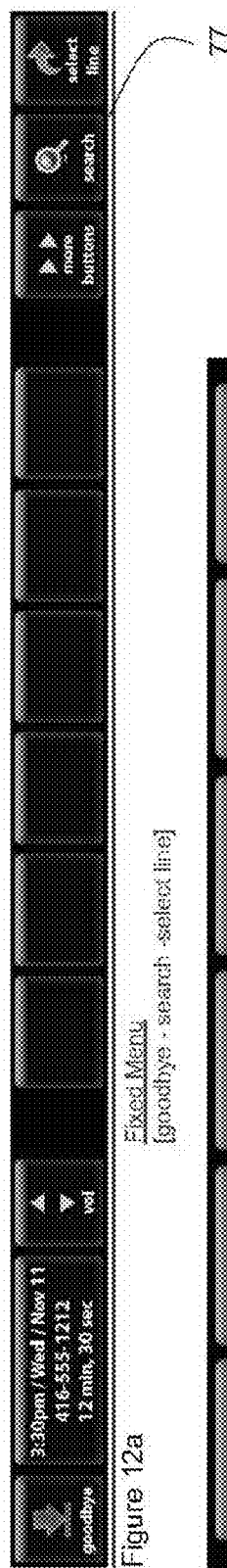
FIGS. 12a to 12d depict exemplary call state active telephony keys.
Figure 12B:
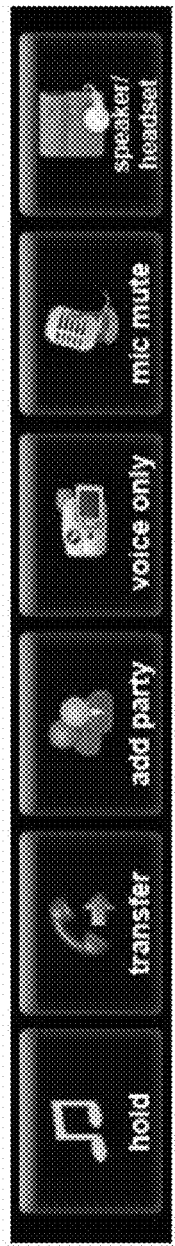
Figure 12C:
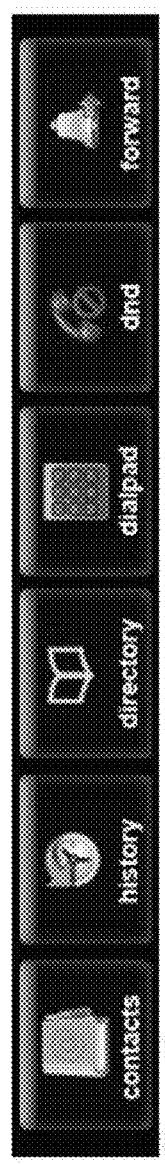
Figure 12D:
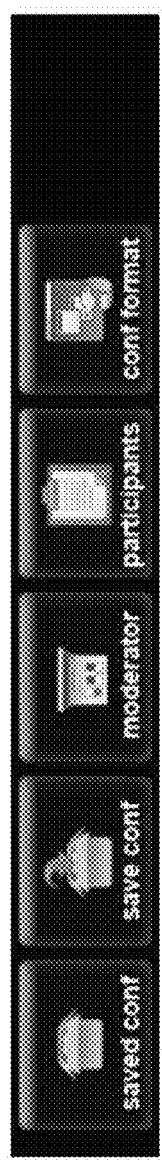
Figure 13A:
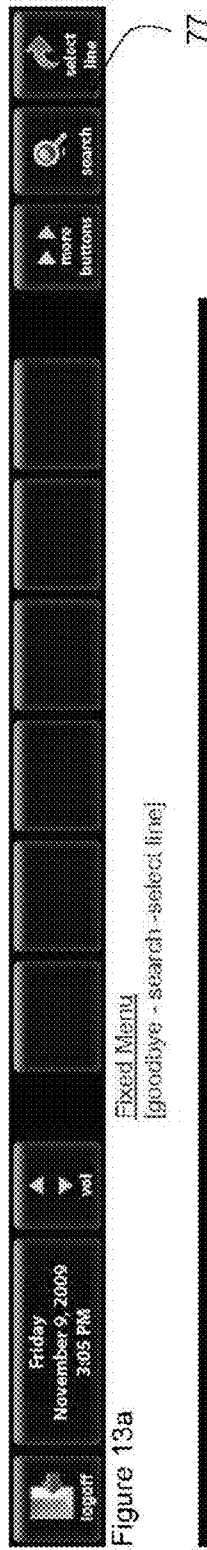
FIGS. 13a to 13d depict exemplary idle state active keys.
Figure 13B:
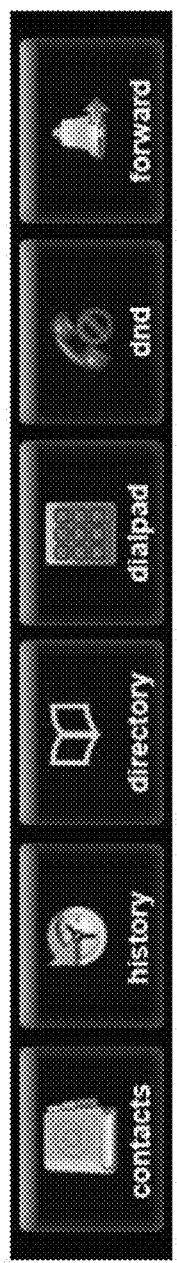
Figure 13C:
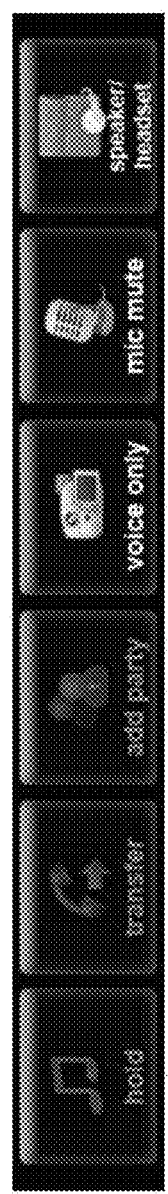
Figure 13D:
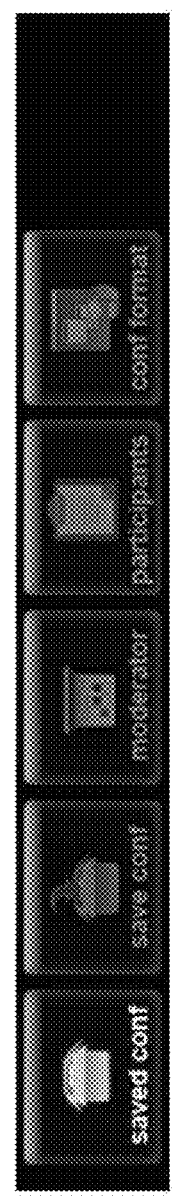

As shown in FIG. 9, the GUI 70 also includes an exemplary toolbar 77, in an idle state and a calls state, comprising context sensitive icons/buttons 80 representing the "high probability" features based on the screen mode, extended menu buttons 82 and extended menu controls 84. The toolbar 77 also includes a scalable, dynamic and/or scrollable sub-toolbar 78 formed of the extended menu buttons 82. In more detail, the context sensitive icons/buttons 80 include fixed menu items, such as, "logoff, "hangup", "search" and "select line". The extended menu buttons 82 in the idle state and the call state may include directories, call controls (active and passive), and conference calls. Depending on the call state, some of the buttons 82 are not active, and are depicted as dimmed or grayed out buttons 83, as shown in FIGS. 10 and 11. Dimming of the display 70's luminance at particular pixel areas, such as button 83, while retaining displayed information (e.g. gray shades) may be accomplished by modulating the amplitude of voltage supplies, or by turning the supply OFF at an interval shorter than the cycle time to button 83 pixel area. For example, on one idle state page, FIG. 11a, the extended menu buttons 82 or sub-toolbar 78 corresponding to the directories and passive call controls include 'contacts', 'history (call, contact)', 'directory', 'dialpad', 'dnd', 'forward', are all active. On another idle state page, FIG. 11b, inactive the call controls buttons 83 include 'hold', 'transfer', 'add party', 'voice only', 'mic mute' and 'speaker/headset', with only the 'voice only', 'mic mute', 'speaker/headset' buttons 82 being active. Another idle state page, FIG. 11c, the conference controls includes inactive buttons 83 'save conference', 'moderator', participants' and 'conference format', with only one active button 82 corresponding to 'saved conference'. Similarly, the corresponding call state pages include extended menu buttons 82, with buttons 82 being active, such as, 'contacts', 'history (call, contact)', 'directory', 'dialpad', 'dnd', 'forward', 'hold', 'transfer', 'add party', 'voice only', 'mic mute', 'speaker/headset', 'saved conferences', 'save conference', 'moderator', 'participants' and 'conference format'. The various pages (idle/call states) are accessible by scrolling using finger flick gestures to jump between pages.

In more detail, FIGS. 12a-d show an exemplary call state comprises 20 active telephony keys or buttons, that is, three keys of the fixed menu 80, namely: 'select line', 'search', and 'good bye'; and 17 keys of the extended menu 82, namely: 'hold', 'transfer', 'add party', 'voice only', 'mic mute' 'speaker/headset', 'contacts', 'history (call, contact)', 'directory', 'dialpad', 'dnd', 'forward', 'saved conferences', 'save conference', 'moderator', participants' and 'conference format', on different pages. Once again, a user may navigate through the different of the extended menu 82 by scrolling the sub-toolbar 78 or by other GUI controls. FIGS. 13a to 13d depict an exemplary idle state comprising 13 active keys, three keys of the fixed menu 80, namely: "select line', 'search', and 'logoff'; and 10 keys of the extended menu 82, namely: 'contacts', 'history (call, contact)', 'directory', 'dialpad', 'dnd', 'forward', 'voice only', 'mic mute' 'speaker/headset', 'saved conferences'. All other inactive keys 83 are grayed out, that is, 'hold', 'transfer', 'add party', 'save conference', 'moderator', 'participants' and 'conference format'.

As already stated, any of the buttons 76, 80, 82 are selectable by touching the associated pixel area on the GUI display 70. Additionally, each button 76, 80, or 82 may also include color representation or color outline to depict the state of the button 76, 80 or 82, as shown in FIGS. 14*a* to 14*c*. For example, a button 83 in an idle state does not include an outline, FIG. 14*a*, while a selected button 82 includes a green outline 87. For example, constant green outline 87 may be used for screen context switches, such as, directories or tool pages, FIG. 14*b*, while a blinking green outline indicates need for a positive action, such as a "select line" while a call is on hold. Meanwhile, a red outline 89 may also indicate selection, such as a constant red for "mic mute" or a blinking red indication action needed, such as "cancel add" to allow terminating the action of adding another party to a call, FIG. 14*c*. In other embodiments, the buttons 76, 80, 82 or 83 may be animated to indicate their current state (active or inactive), depending on the call state (active or idle).

Figure 15A:
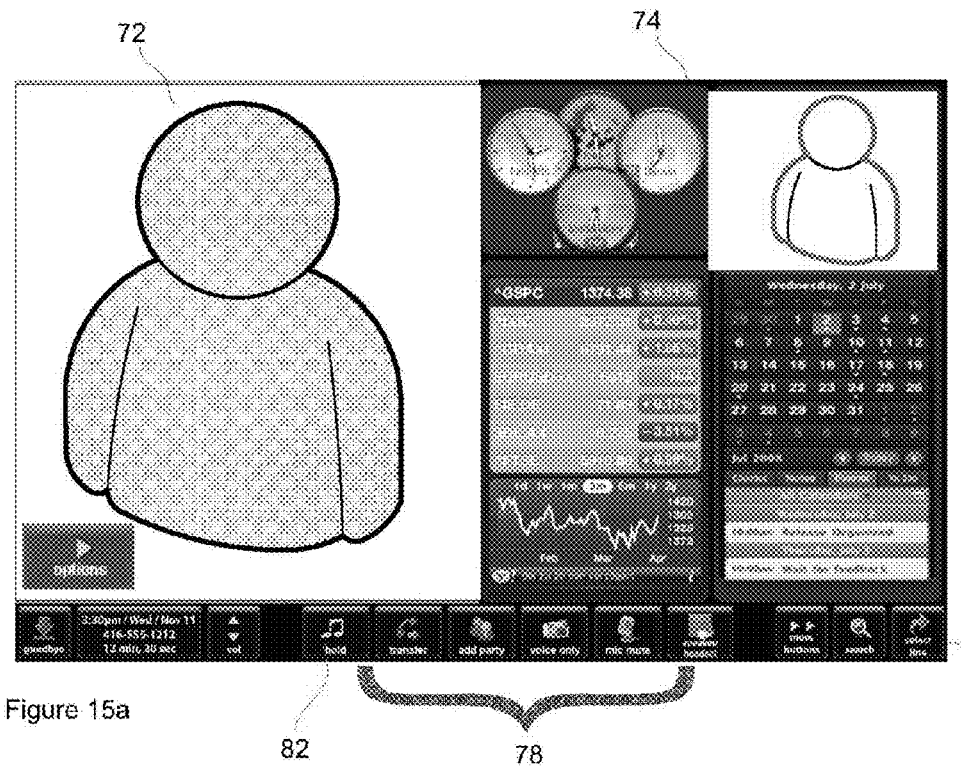
FIGS. 15a to 15c depict the available extended menu options accessible via the scrolling toolbar, while in a call state.
Figure 15B:
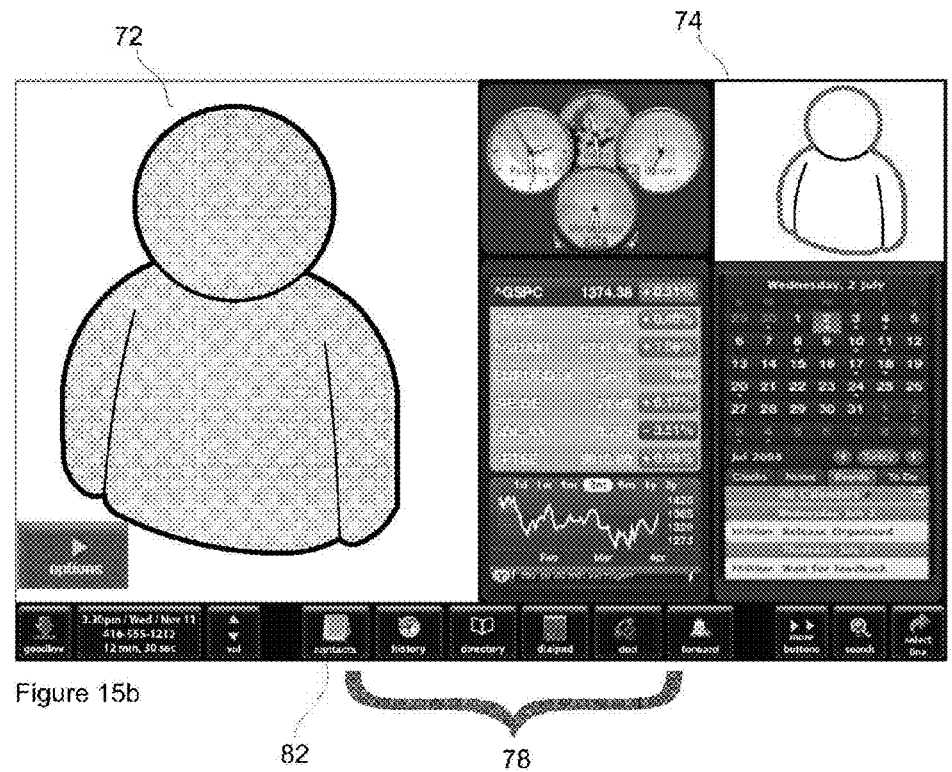
Figure 15C:
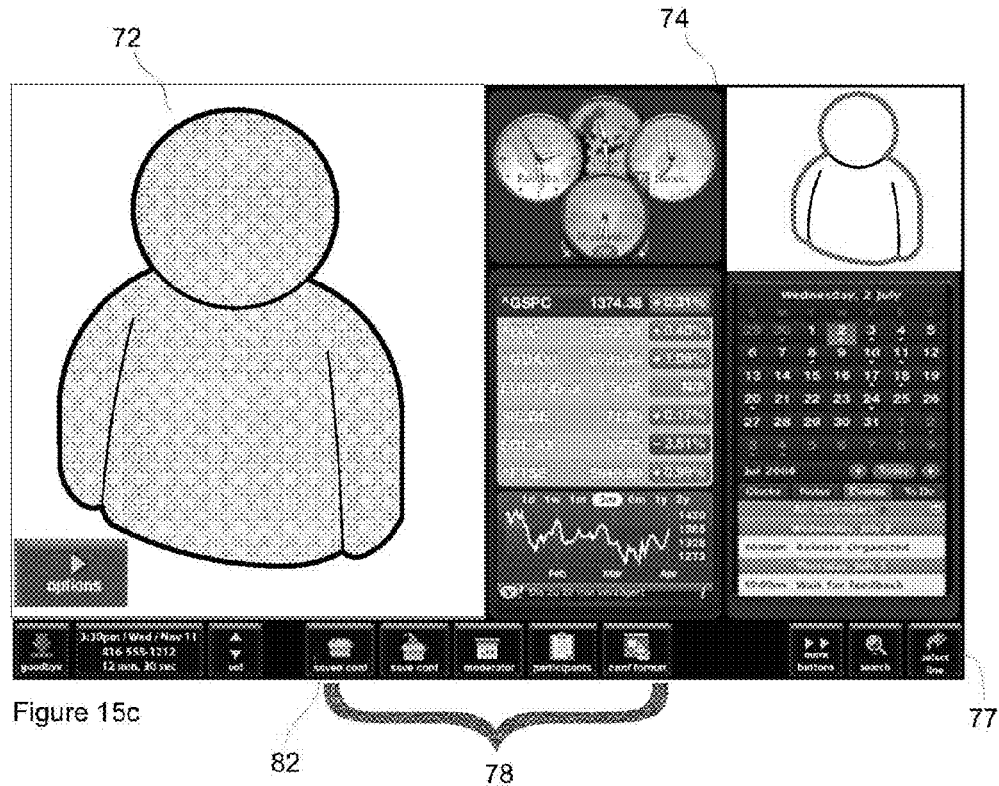
Figure 16:
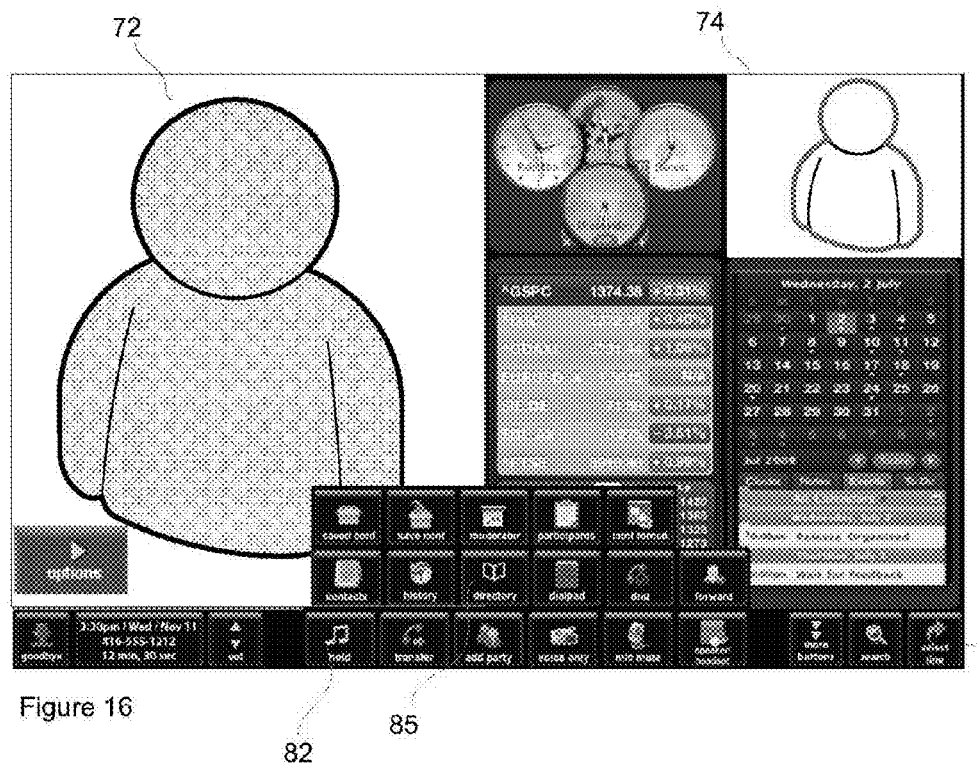
FIG. 16 depicts an extended menu overlay.
Figure 17:
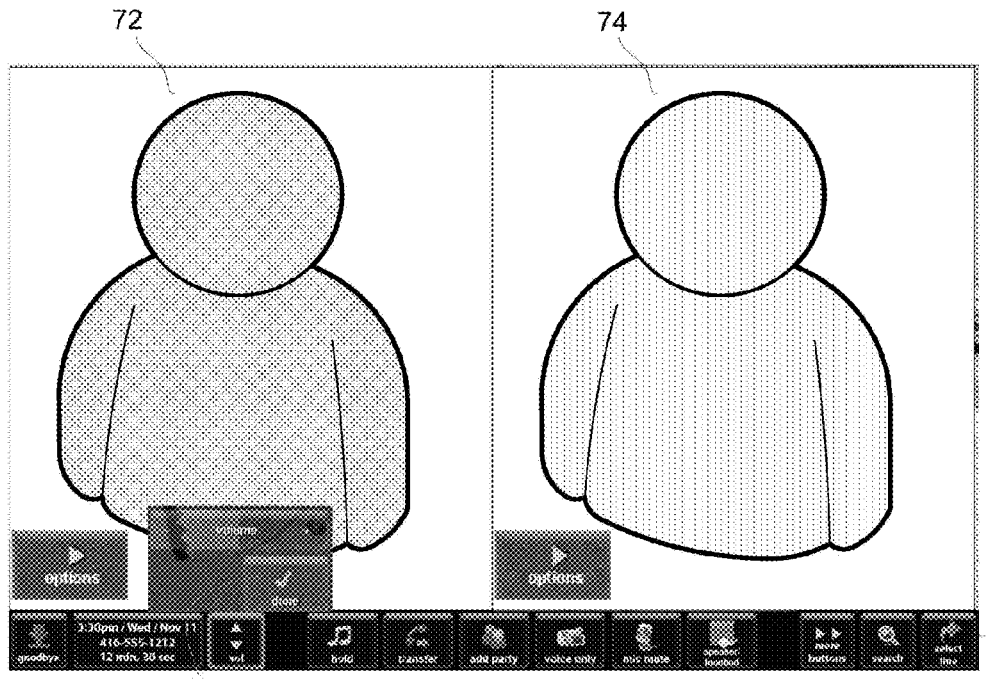
FIG. 17 depicts a transparent pop-up key overlay.
Figure 18:
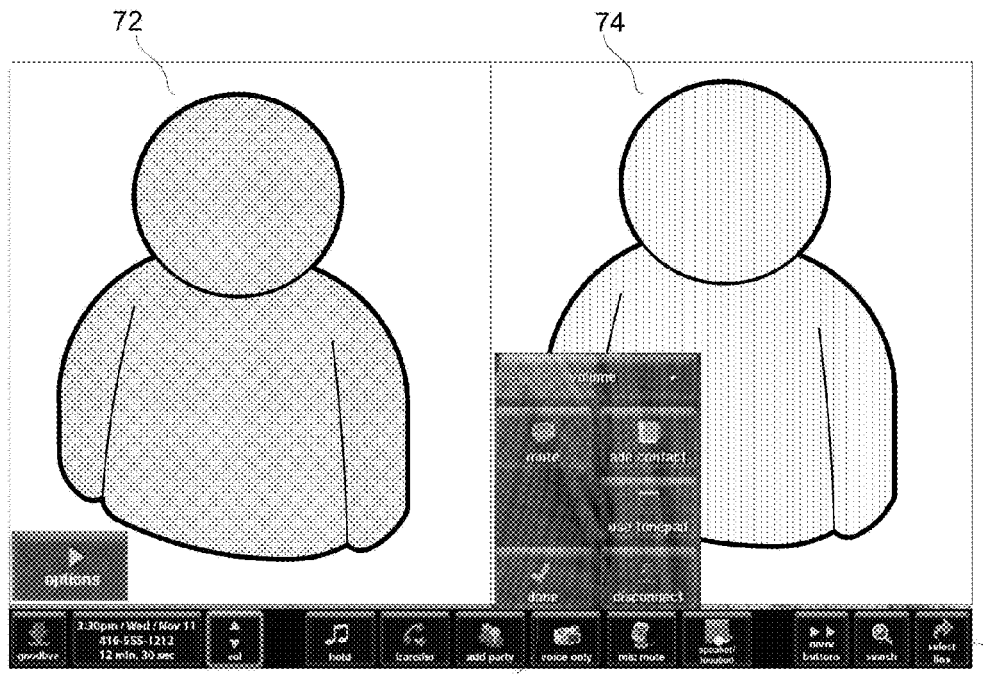
FIG. 18 depicts another transparent pop-up key overlay.
Figure 19:
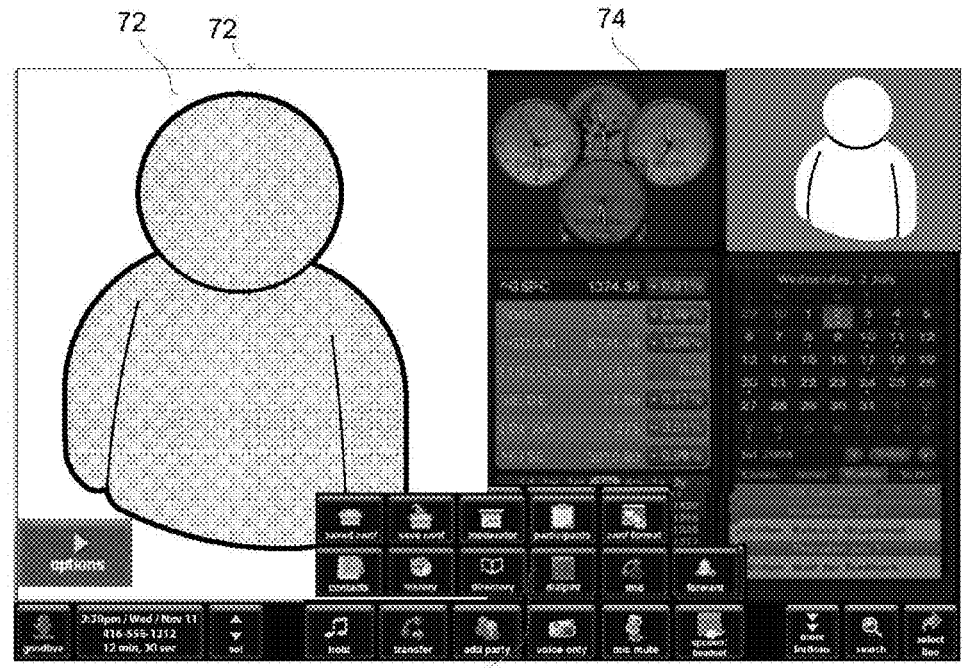
FIG. 19 depicts yet another pop-up key overlay.
Figure 20:
FIG. 20 depicts yet another pop-up key overlay.

As discussed above, in order to accommodate the various key 82 options available in the idle state and the call states, the various keys 82 are displayed in logical groupings per page, and the different pages are accessible by scrolling the tool bar 78 using finger flick gestures or other GUI controls. The scrolling feature allows for displaying all the available video telephony button 82 options while consuming minimal the GUI 70 real-estate. FIGS. 15*a-c* show the available extended menu 84 options accessible via the scrolling tool-bar 78, while in a call state. Alternatively, the entire available extended menu 84 options may be displayed simultaneously as pop-up keys 85 above the sub-toolbar 78, as depicted in FIG. 16. The pop-up keys 85 are overlaid the video partition 72 and the application partition 74, and may be substantially transparent, such that video, text, graphical or application content remains visible in the foreground partitions 72, 74, as shown in FIGS. 17 and 18. Alternatively, the content in the foreground partitions 72, 74, may be substantially grayed out by dimming the corresponding pixel areas 72, 74, so as to increase the visibility of the pop-up keys 85, FIGS. 19 and 20. For example, the pixels corresponding to favourites 86 and running applications in partitions 72 and 74, respectively, are automatically dimmed when the keys 85 pop up above the sub-toolbar 78, and the applications continue to run unabated.

Figure 21:
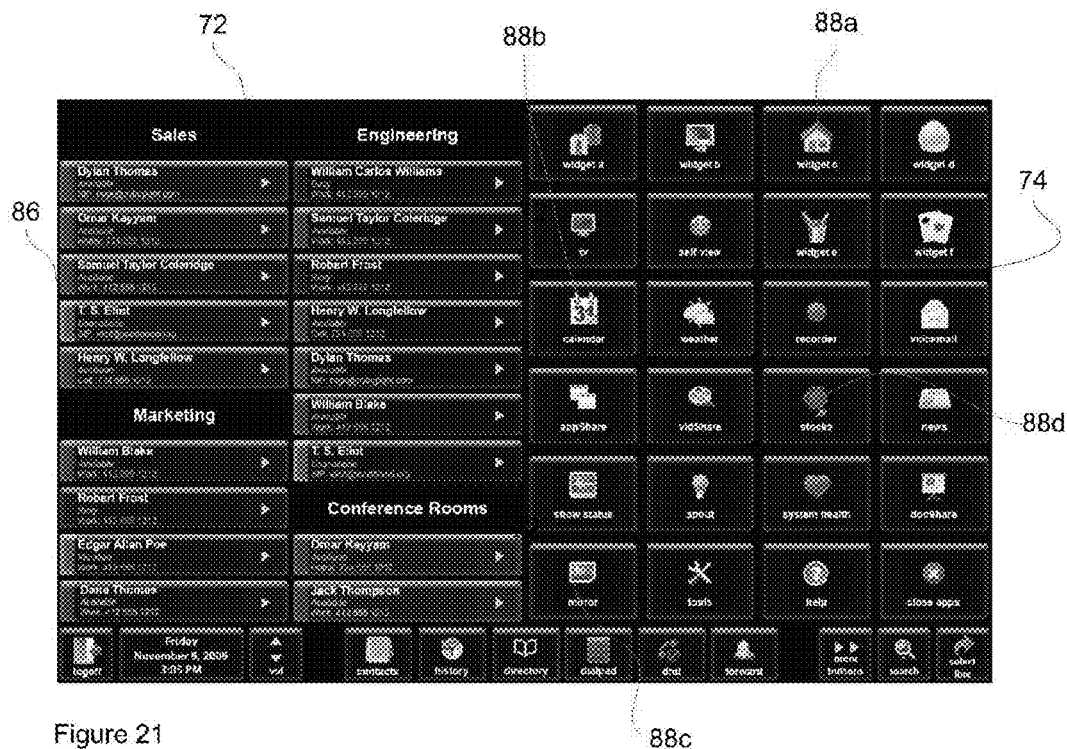
FIG. 21 depicts an exemplary idle page.
Figure 22:
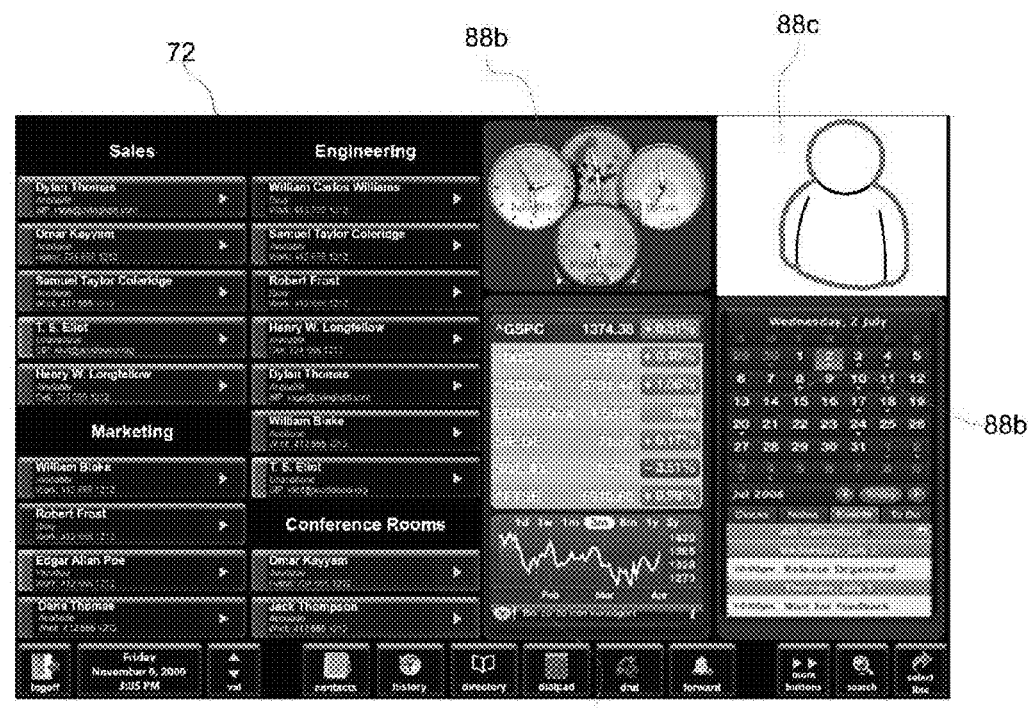
FIG. 22 depicts a GUI display with a plurality of concurrent running applications.

FIG. 21 depicts an idle page with a video window 72 populated by a favourites menu 86, and occupying half of the GUI display 70, with the user's favourite applications/widgets or actions, such as abbreviated dialling for contacts/presence. The idle page also comprises an application portion 74 with a plurality of graphical icons 76 corresponding to available application programs or widgets, in the other half of the GUI display 70. Several applications may be selected to run concurrently i.e. multi-tasking, and the corresponding icons/buttons 76 are highlighted, as shown in FIG. 8. Preferably, each application menu page includes a GUI control object which runs all the selected application programs, such that the running application programs open on a different page, or the selected application programs start running automatically following a predetermined touch gesture, or GUI control actuation. For example, selecting the applications: "World Clock" 88*a*, "Calendar"88*b*, "Mirror" 88*c*, "Stocks" 88*d* in FIG. 21 causes all four selected applications 88*a* to 88*d* to run concurrently in the application partition 74, as shown in FIG. 22.

It should be noted several applications may be selected from different application pages, and these running applications may be opened on one or more pages. The transition from the selected applications page of FIG. 21 to the running applications page of FIG. 22 may result from a GUI control object being actuated, or it may be caused by a predetermined touch gesture performed on the selected applications page, such as a vertical finger flick in the application portion 74, as previously discussed with reference to FIG. 8. Alternatively, the transition may occur after the maximum number of allowable concurrent running applications has been reached, or should the user only select a fraction of the maximum allowable applications then the user is prompted to add more applications, or execute the already selected applications. The "World Clock" application and the "Mirror" application are allocated windows 88*a* and 88*c* of the GUI 70, respectively, with each window being dimensioned at 320×240 pixels. As an example, the "Mirror" application shows a self-view image of the calling party A 96 video captured by the camera 44 of the calling party A's videophone terminal 12. Meanwhile, the "Calendar" and "Stocks" are allocated windows 88*b* and 88*d*, respectively, with each window measuring 320×480 pixels. Each window 88*a* to 88*d* may include a title-bar and may be resized or closed, using appropriate GUI controls or predetermined touch gestures.

Figures 23, 24:
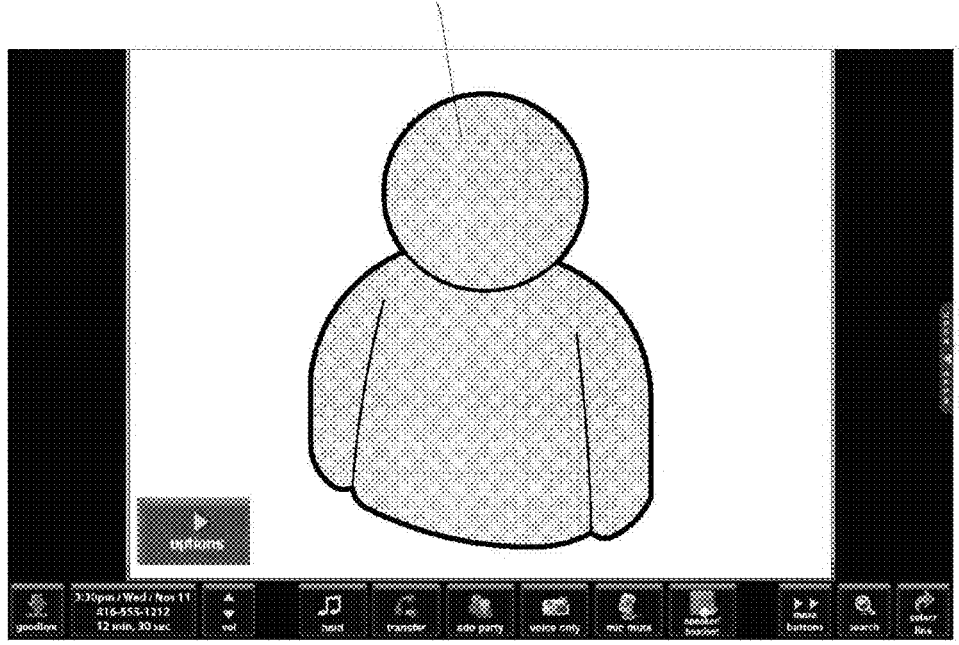
FIG. 23 depicts a favourites menu.
FIG. 24 shows a standard definition (SD) call in progress.
Figure 25:
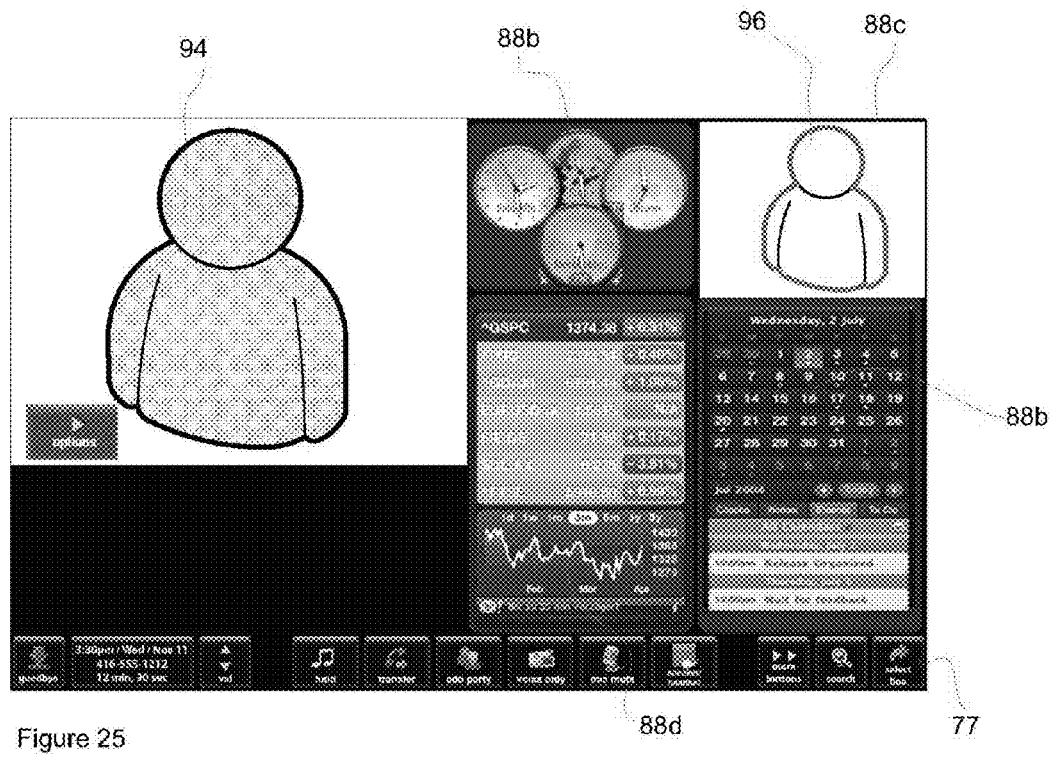
FIG. 25 depicts an SD call in progress along with four concurrently running applications.

Generally, the various applications are assigned specific window sizes for display on the GUI display 70. For example, the system applications, such as, "mirror", "tools" and "tv" applications may run in full screen mode (1280× 720) while half-screen system applications include, but are not limited to, "help', "show status", "about", "docShare", "vidShare", "tv" and "system health". Three quarter screen system applications may also include "docShare", "vidShare", "tv", and quarter screen system applications include "self view" and "appShare". FIG. 22 shows two applications, "World Clock" 88*a*, and "Mirror" 88*c* running in 320×240 pixel windows, while the other two applications, "Calendar" 88*b* and "Stocks" 88*d*, run in 320×480 pixel windows. In FIG. 23, there is shown only the favourites menu 86 in the video partition 72, with the running applications hidden from the applications window 74. As such, the 640×720 pixel area normally reserved for applications may be replaced by wallpaper 90. However, the running applications may be caused to reappear in partition 74 by actuating an "open app window/close app window" tab 92. FIGS. 24 to 32 depict exemplary screen layout options, and relating to active call states. For example, FIG. 24 shows a standard definition (SD) call in progress between calling party A 96 (not shown) and called party B 94, with the applications closed. FIG. 25 shows an SD call in progress between party A (caller) 96 and called party B 94, along with four concurrently running applications 88*a* to 88*d* on the GUI display 70, one of which is the "Mirror" 88*c* application with a self-view of the calling party A 96.

Figure 26:
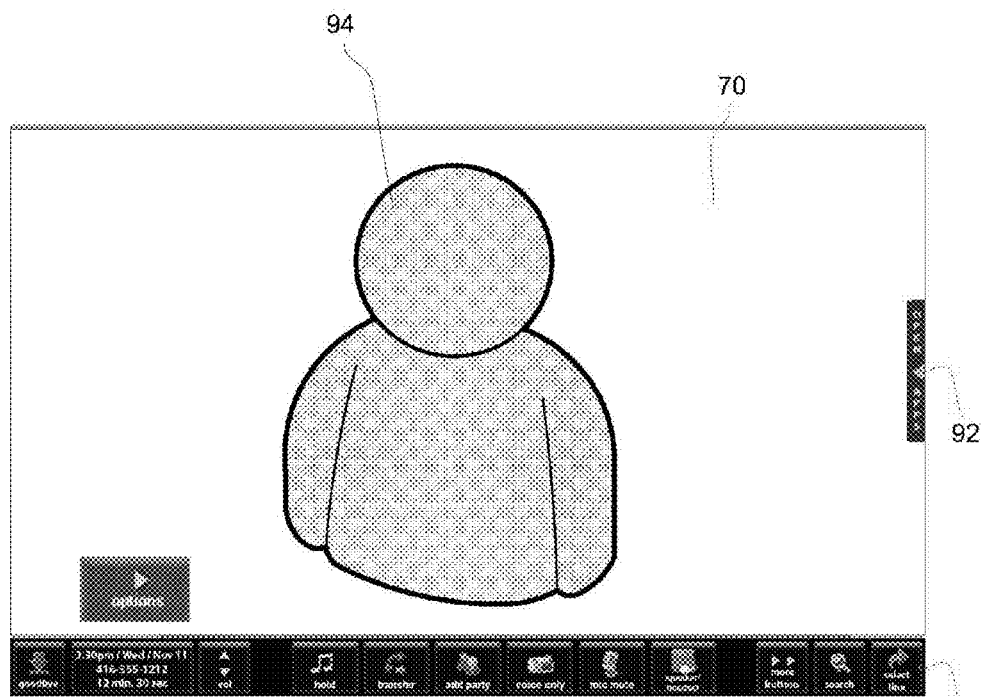
FIG. 26 depicts a full-screen high definition (HD) call in progress.
Figure 27:
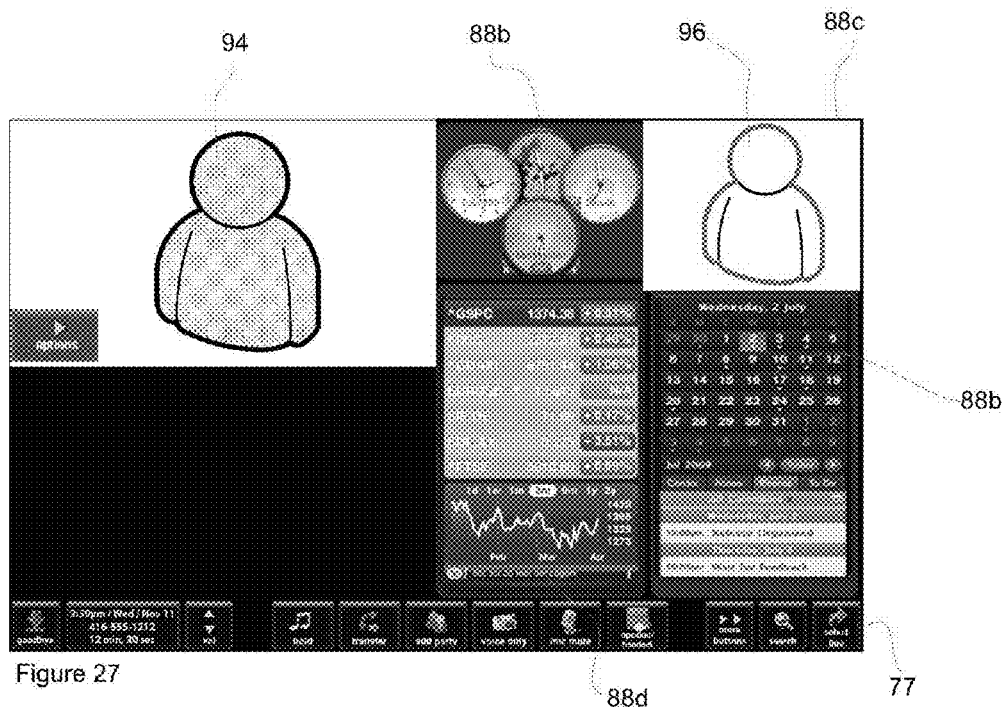
FIG. 27 depicts a high definition (HD) call, scaled down to fit 640×360 pixels, in progress with a running application.
Figure 28:
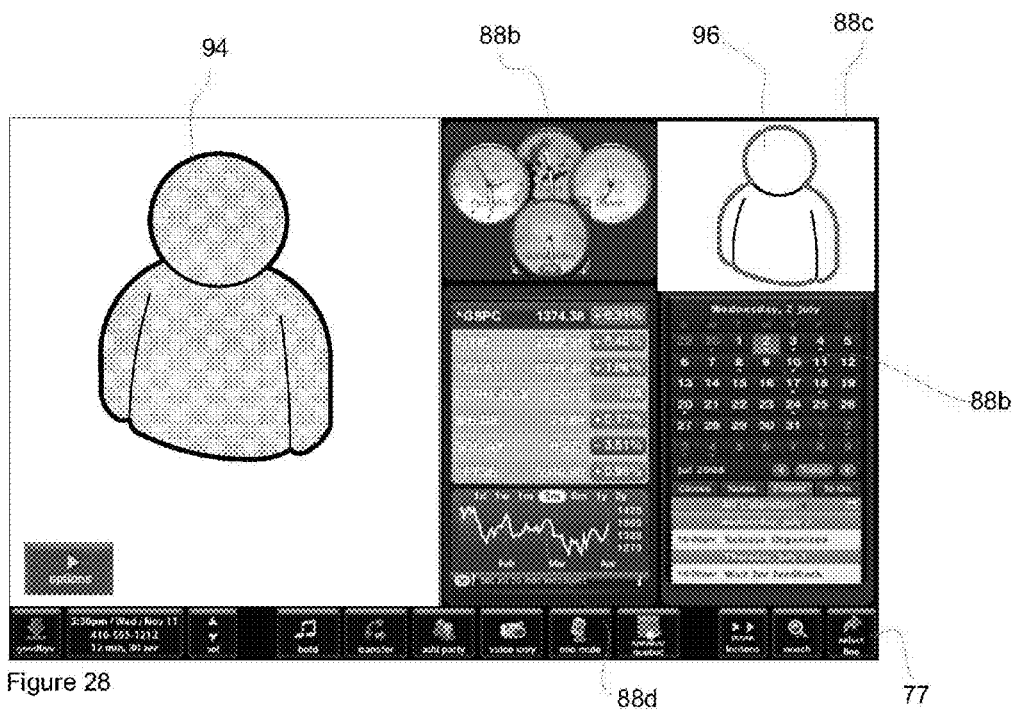
FIG. 28 also depicts a cropped high definition (HD) call, with running applications.
Figure 29:
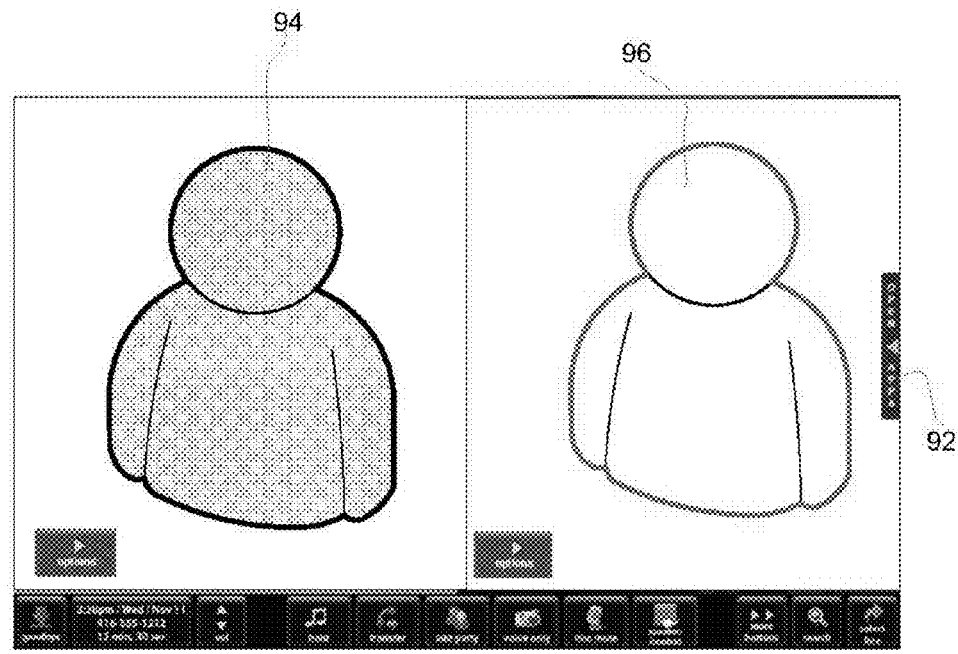
FIG. 29 depicts a 2-way conference call with the video of both participants.
Figure 30:
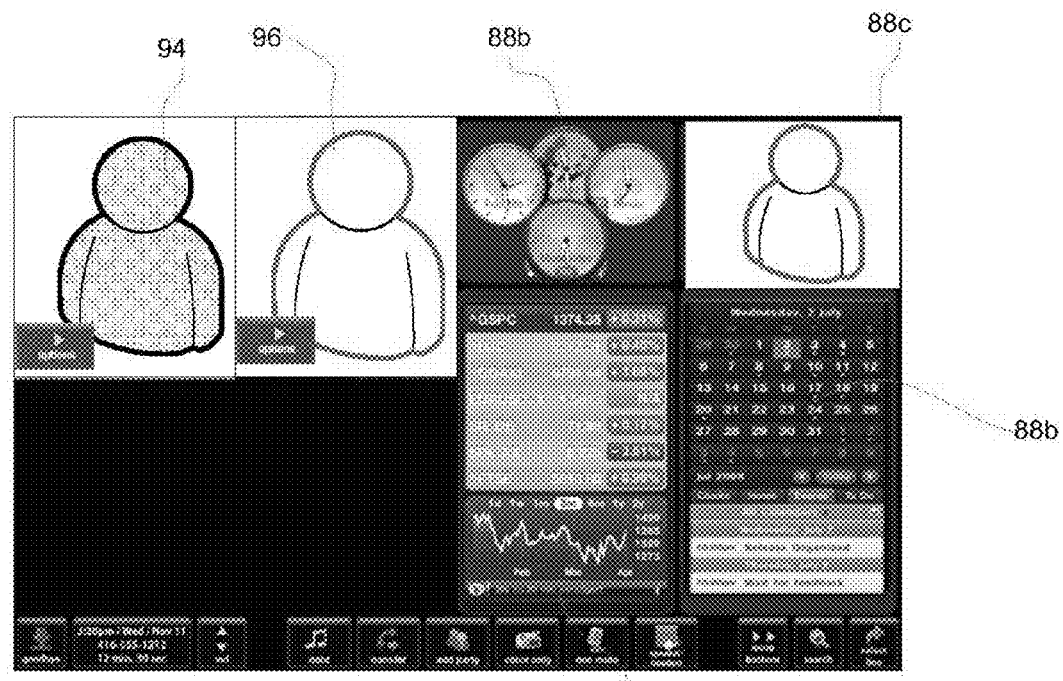
FIG. 30 depicts the 3-way call of FIG. 30, but with applications running.
Figure 31:
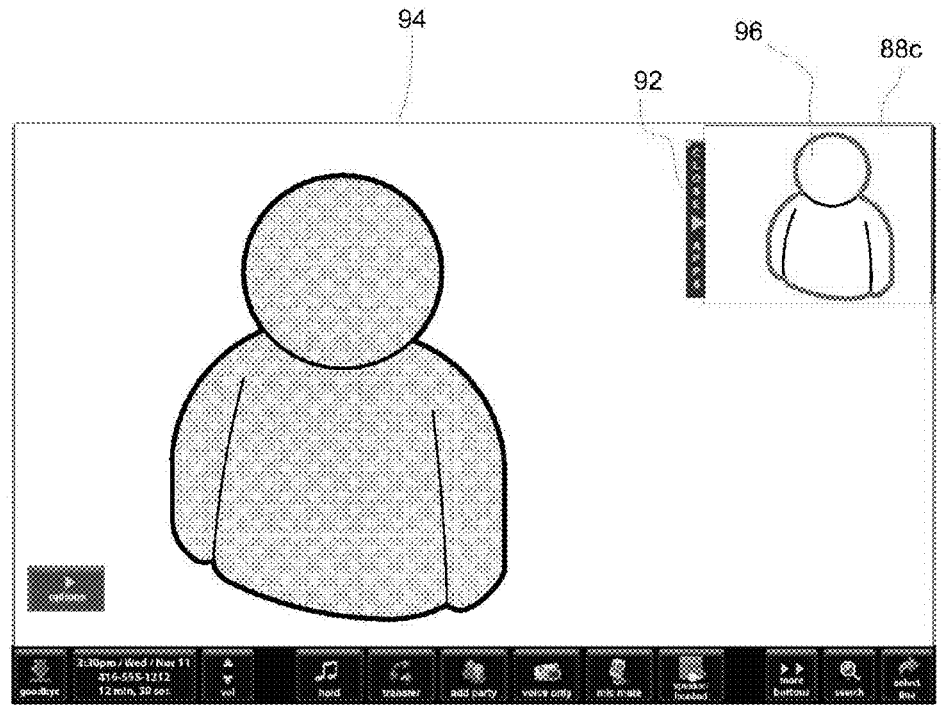
FIG. 31 depicts an HD call with a one application running concurrently.
Figure 32:
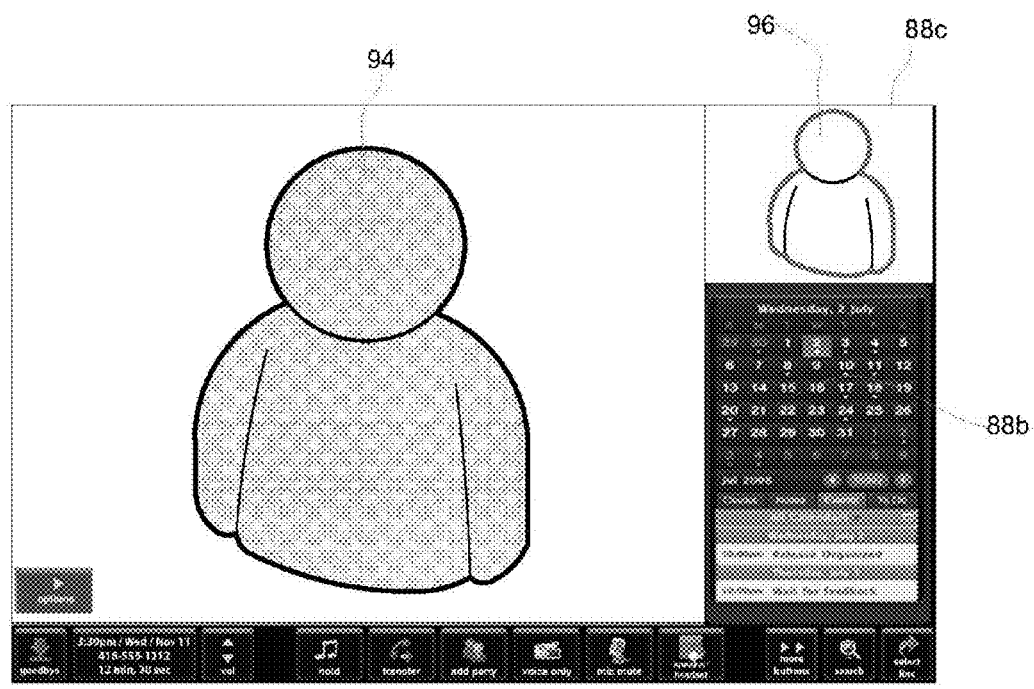
FIG. 32 depicts an SD call with two applications running concurrently.

FIG. 26 shows a full-screen high definition (HD) call, dimensioned at 1280×720 pixels, in progress with applications hidden, but are accessible via the "open apps" tab 92, while FIG. 27 shows a high definition (HD) call, scaled down to fit 640×360 pixels, in progress with running applications visible in the applications partition 74. FIG. 28 also shows a high definition (HD) call, cropped to fit the 640×720 pixel video partition 72, with running applications 88*a* to 88*d* visible in the applications partition 74. FIG. 29 shows a 2-way conference call with the video of both participants 94, 96, each occupying half of the GUI display 70, such that the running applications 88*a* to 88*d* are hidden, but are accessible via the "open apps" tab 92. FIG. 30 shows the 2-way call of FIG. 29, but with applications 88*a* to 88*d* running in the applications portion 74. The video feed from both participants 94, 96 appear in the video partition window 72, but in a scaled down form. Should other participants join the conference call, then their video feeds are displayed within the video partition 72 only when the running applications 88*a* to 88*d* are visible, or all participants 94, 96 are displayed on the full screen, with running applications hidden. FIG. 31 shows an HD call with a self-view application ('Mirror') 88*c* running, while FIG. 32 shows an SD call with a self-view application (320×240 pixels) 88*c* running and calendar application (320×480 pixels) 88*d* running, in a single application column.

Figure 33:
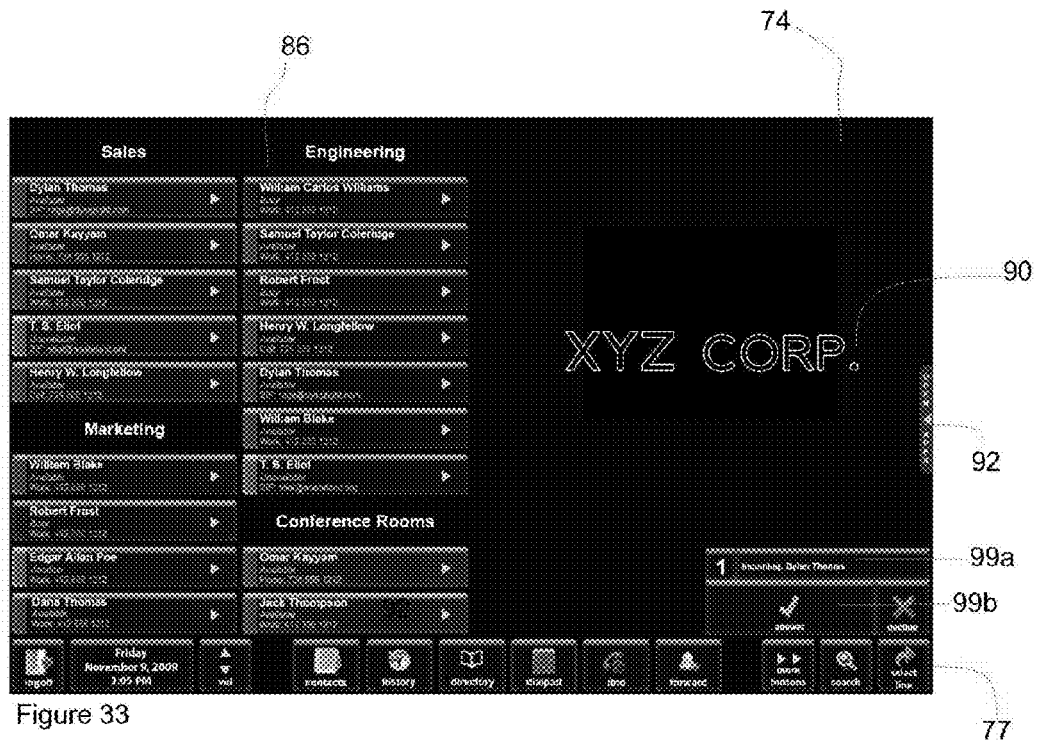
FIG. 33 depicts an incoming call.
Figure 34:
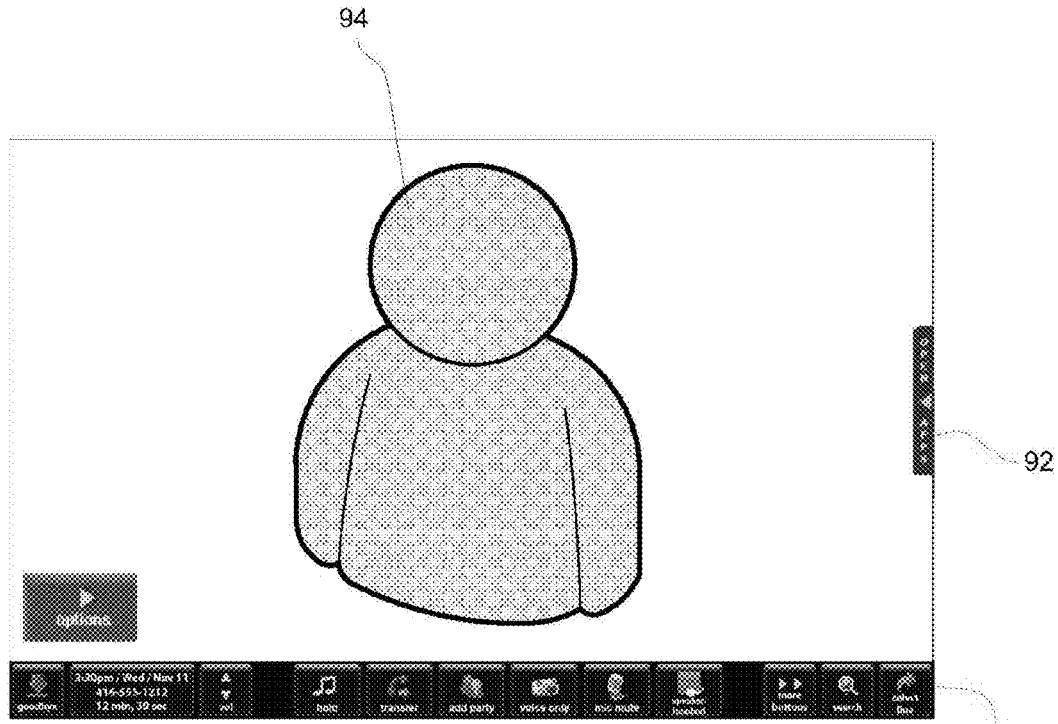
FIG. 34 depicts further details of the incoming call of FIG. 34.
Figure 35:
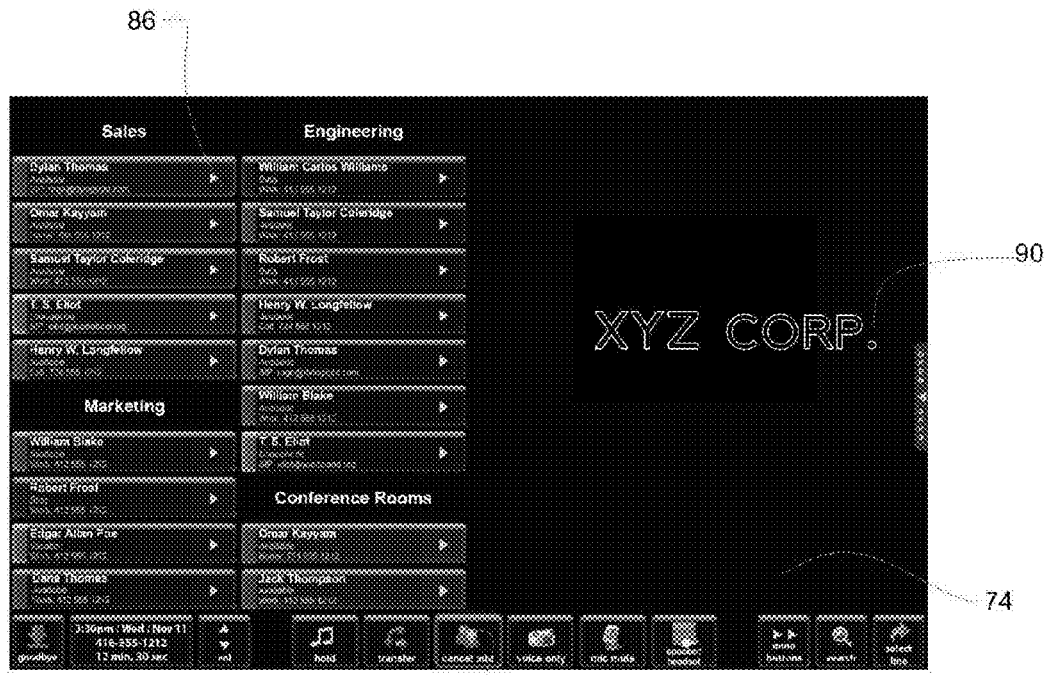
FIG. 35 depicts an exemplary favourites page with selected directory listings.
Figure 36A:
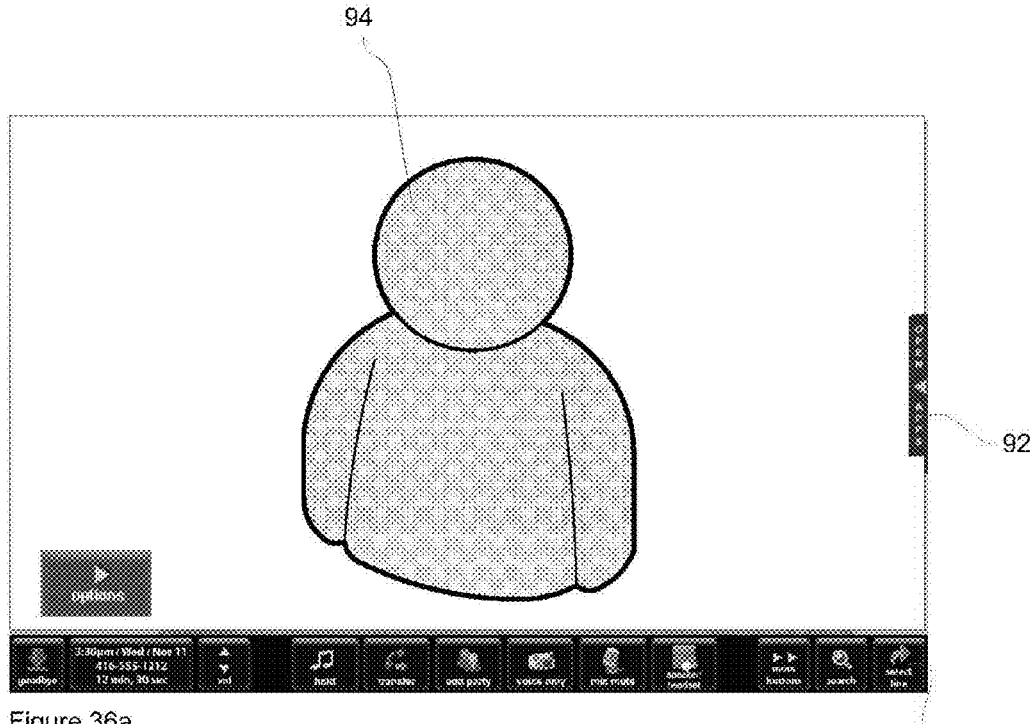
FIGS. 36a to 36e depict exemplary screenshots for adding another party to a multi-way conference call.
Figure 36B:
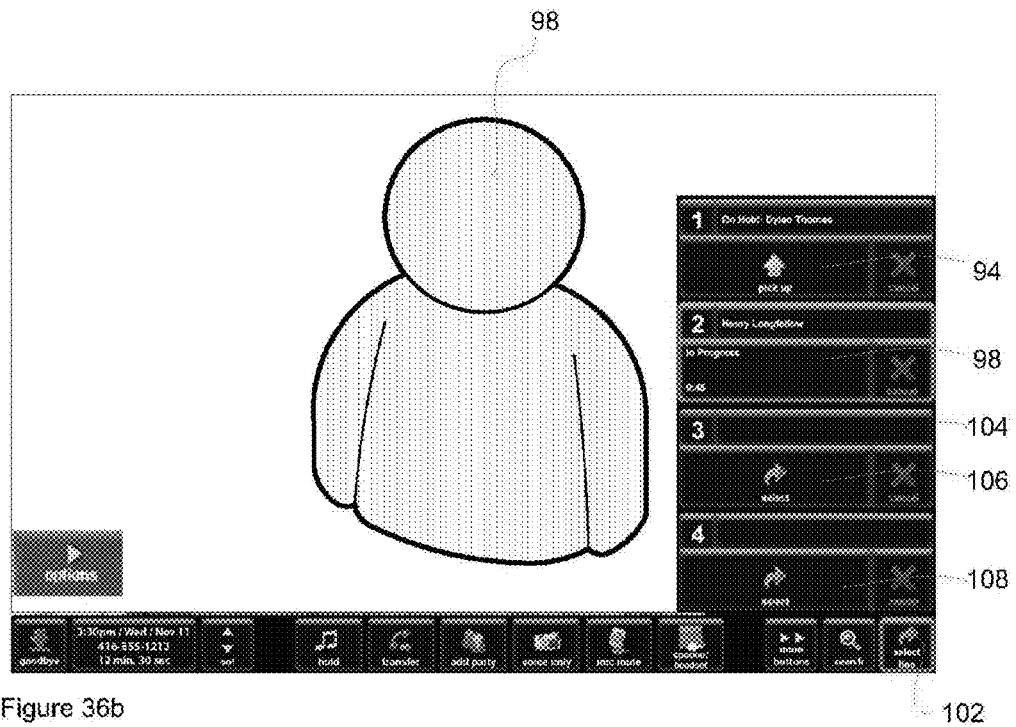
Figure 36C:
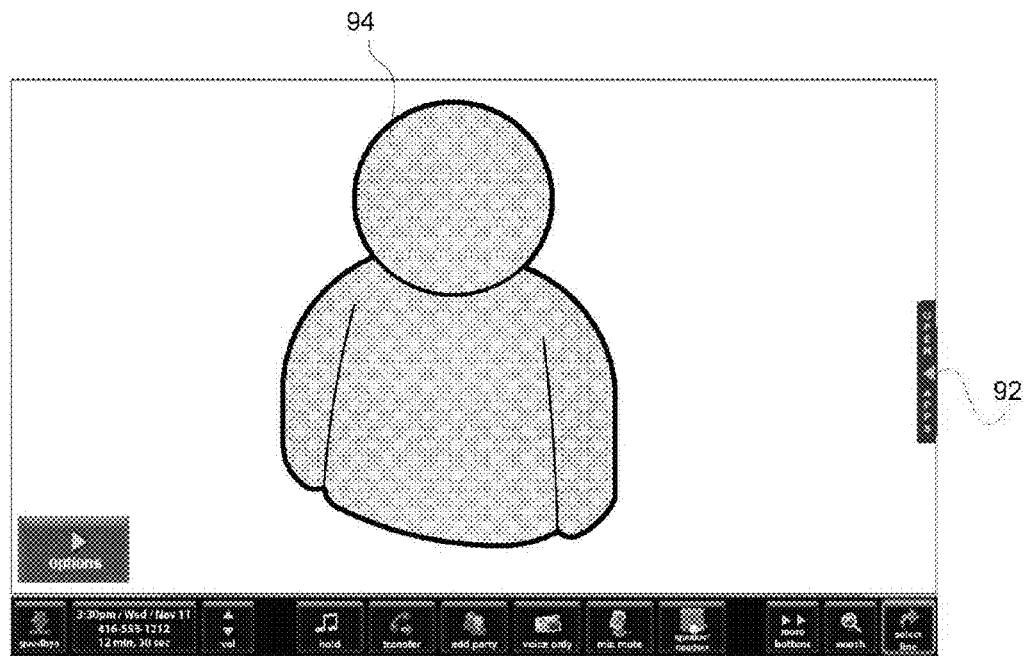
Figure 36D:
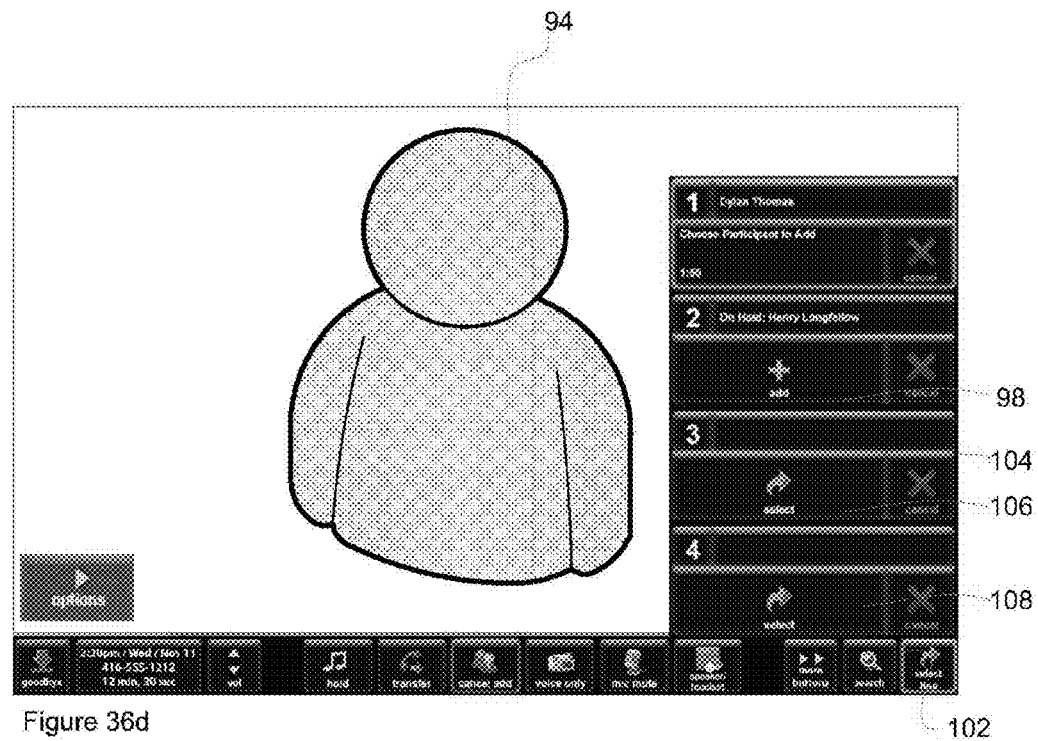
Figure 36E:
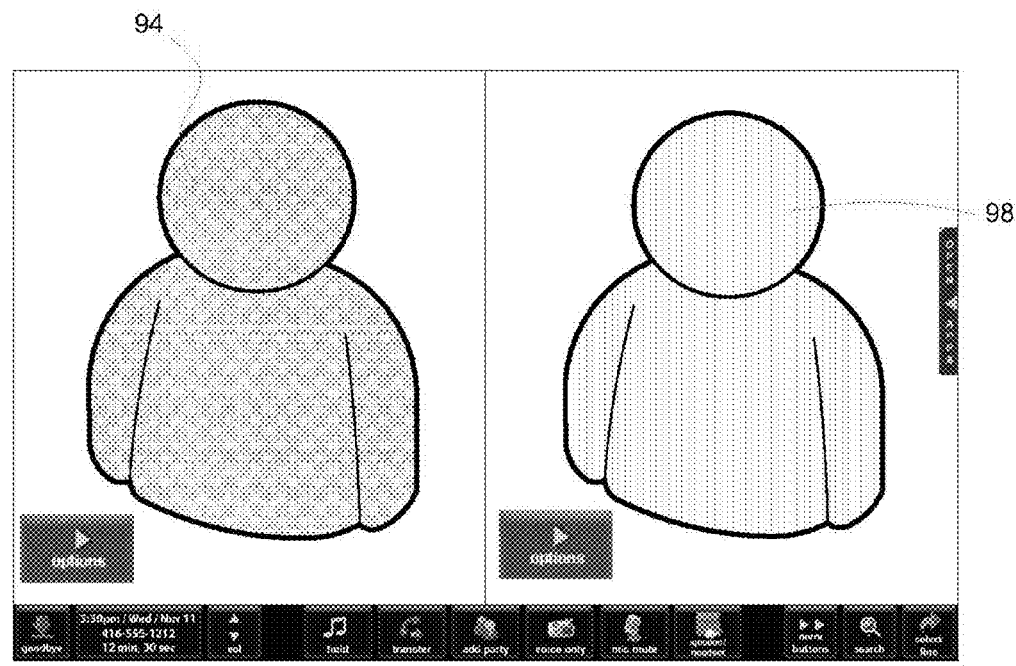

A 3-way conference call will now be described with the aid of exemplary screenshots of FIGS. 33 to 36. From an idle state, FIG. 33 shows button 99 alerting participant A 96 of an incoming call 99 in the application partition 74 (with applications hidden). The calling party B 94's details (callerID) and call handling options (answer or decline), are presented on buttons 99*a* and 99*b*, respectively. Choosing to answer the call causes the display of the video corresponding to the calling party B 94 in HD, as shown in FIG. 34, with the display of the video corresponding to the called party A 96 being hidden. While in the 2-way conference call, another party 98 may be invited to join by actuating the "cancel/add" key 100 on the extended menu portion 78 of the toolbar. This action brings up the favourites page 86 with selected directory listings, FIG. 35. Preferably, the directory 86 is overlaid the video feed content from the other participants 94, 96 in the video partition 72 and/or the applications partition 74, such that the video from these participants 94, 96 remain visible. As such, the directory 86 may be substantially transparent, or the foreground video feeds are grayed out slightly to highlight the directory 86. After choosing the new participant 98 from the directory or favourites 86, the two participants 94, 98 are displayed on the full screen, as previously discussed in FIG. 29. FIGS. 36*a* to 36*e* show other exemplary screenshots for placing one party 96 on hold, while in a conference call, and adding another party C 98 to the conference call already in progress. Starting with a conference call in progress in FIG. 36*a*, a flashing "select line" button 102 indicates that there is an incoming call from party C 98, and pressing the "select line" button 102 causes a participants status bar overlay 104 to appear on the GUI display 70. The participants status bar 104 shows ongoing calls, and calls on hold, specifically FIG. 36*b* shows that party A 96 has placed party B 94 on hold, while party A 96 contemplates adding another party C 98 to the ongoing conference call. As such, only the video feed from party C 98 is presented on the display in FIG. 36*b*. The calling party A 96 can toggle between full screen displays of party B 94 and party C 98 (FIGS. 36*b, c*), and party C 98 can be added to the conference call (FIGS. 36*d, e*). Other participants 106, 108 may also be added to the conference call, such that all, or some, of the participants 94, 96, 98, 106 and 108 are displayed on the GUI display 70. Alternatively, while on hold, the video feed from party B 94 remains on the GUI display, albeit smaller in size or substantially grayed out.

In another exemplary embodiment, conference call scheduling may be performed via a speech recognition engine. For example, a user may utter a command: "Conference call with Sam Brown, Sumi Miyoko, Lars Petersen, Amit Chandra, and the speech recognition engine searches the local contact list, favourites, call history, and LDAP directory for these individuals contact numbers. Using the individuals' calendars and time zones, an algorithm suggests at least one date and time for the meeting that caters for all participants despite the different geographical locations. Advantageously, calls may be scheduled in a more expeditious manner without the typical back and forth rampant in prior-art scheduling systems.

In another exemplary embodiment, communications devices 12 include a computer program comprising at least one scheduling application for setting communications between two parties. In one exemplary scenario, calling party A calls party B, however, party B is unavailable and party A is prompted to leave a voicemail or video message. Instead of leaving a voicemail/video message, party A presses the "Callme" button of the scheduling application which launches the application, and a "Callme" interface window pops up prompting party A to send an alphanumeric message (email or txt) to party B. The "Callme" interface window on party A thus depicts the contact name (party B) and a Subject section in which party A enters the subject to be discussed. The message from party A is received on party B's device 12, and shows the request from party A, including party A's presence information and the subject. Alternatively, a message is sent to party B with a link to a temporary page with party A's presence and calendar information. The request appears in a "Callme" interface window on party B's device and is categorized under "Pending Calls". Therefore, party B may choose to call party A back at any time by pressing the pending call item depending on the availability of party A, as dictated by the presence information.

In another exemplary embodiment, the scheduling application may be included as an add-in module to an email application, such as a Microsoft Outlook™. In a exemplary scenario, party A and party B have been emailing back and forth about a particular subject, and now party B desires to talk to party A in order to carry on the discussion. From one of the email messages, party B clicks on party A's name and selects "Callme" from the drop down menu. Party A's device (phone) shows the request and party B's presence and subject of email message in the "Callme" interface window on party A's phone, categorized under "Pending Calls". Therefore, party A may choose to call party B back at any time by pressing the pending call item, depending on the availability of party B, as dictated by the presence information.

An exemplary interface window comprises a home screen of party B with a list of pending calls and the subject. Presence information may be pulled from either the calendar or the phone state (BLF), and can also be manually set by the user (party B). The interface window also includes a status line with more detailed information on the party B's availability. The status line also allows the party B to manually override any presence information deciphered by the system. For example, the system might indicate that party B is busy and unavailable; however, party B might make allowances for important calls to come through, by alerting party A to that stipulation.

Touching the contact in the "Pending Calls' window opens up another window with additional information on the contact in question, party A. As an example, party A's contact details may include further presence information on the contact, such as, the current location of the contact (Home, Toronto Office, Berlin Office, HWY 401); any pending calls associated with that contact, including subject, time of request and time zone; party A's calendar openings with times translated to party B's time zone. This interface window also includes a call button to call the contact (party A). Actuation of the call button causes the application to present a further new window with available numbers belonging to party A, and/or additional options or available actions, such as, email or instant messaging.

In order to initiate a call, party A actuates a "CallMe" application button, and the interface window shows a blank contact name field and a blank subject field. A contact party B may be added by choosing a contact person from a contacts directory. However, if the CallMe button is pressed from a call or an email message, then these fields are automatically filled in. Also, from within an email application, party B can also click on the presence icon of a contact (party A) and select "Callme" from the menu. This will automatically fill in the contact and subject based on the information in the email message. A plurality of notifications can be received, such as:

Email received with link to a temporary webpage showing initiator's presence and calendar availability (available for 24 hours);

Mobile phone widget displaying pending calls;

Videophone application displaying pending calls;

Desktop widget displaying calls;

IP phone XML notification.

In another exemplary embodiment a scheduling application is used to set a specific time for a call between two or more parties. A new call may be scheduled by calling up a "Schedule a Call" interface window, and entering the subject, call duration, and call attendees. Party A may add a contact (party B) by adding the contact's email address, or by choosing a contact from a contacts directory, with the contact's presence and calendar information. Having completed the subject information, call duration and attendees in the "Schedule a Call" interface window, pressing the Next button presents the scheduling grid. Initially, the grid will auto fill itself with the next four time slots that work for all the attendees based on their calendars and the duration of the call. However, manual editing is also possible by clicking on a date. Choosing a particular date causes a calendar selection tool to launch, so a user can pick a date and time but also shows who is available. If an attendee is unavailable, the grid will show a grey box.

The invitation to the call by party A arrives on the invitees' devices and appears in a "Schedule Calls" interface window. For example, invited party B may click on a scheduled call to:

1. Automatically join conference
2. Send an "I will be late" notification
3. Send an "I can't make it" notification The "Schedule Calls" interface window also includes a button for creating a new scheduled call, as described above. Clicking on the invite launches the schedule grid, and clicking on an individual contact allows for a view of that contact's presence and calendar information, while the invite windows also shows the next time slots that work for everyone based on calendars and duration of meeting.

In FIGS. 37a to 37g, a virtual keyboard 110 may be called up by pressing the "search" button 112 from the extended menu controls 84 (FIG. 9) to provide alphanumeric text entry to enable searching, contacts, directory, favourites 86, and history. The contacts lists typically comprise personal contacts, which tend to be unique to an individual user, and are generally user generated and/or derived from the call history. As such, the contacts list is editable and support multiple folder for personalized sorting or grouping of contacts. The directory may be a global directory with system directories (LDAP), VAS global directories, and supports multiple folders. Both the contacts and the directory, including call history, are searchable via a global search, and abbreviated dialling is also supported. The virtual keyboard 110 may include one or more soft keyboard embodiments, such as the standard (QWERTY) and/or non-standard configurations of symbols on the displayed icons of the keyboard 110. In a typical search scenario, the virtual keyboard 110 is accompanied by a search bar 114 which displays the inputted query 116. A results window 118 appears above the search bar 114 with entries corresponding to the query 116, the results appear in real time and converge as the user enters the search string 116. All matching entries from the searchable lists (contacts 120, directory 122, favourites 86, and history 124) are displayed. The desired contact name may be selected using a brief single-contact touch gesture, FIG. 37d, or other input mechanism. Should there be more entries than may be displayed in the search results window 118, the user may refine the search even further by enhancing the search parameters, typically by inputting more characters. The search results and the virtual keyboard 110 may be presented on the full GUI display 70, or may be overlaid a foreground images or video, as discussed above.

Figure 37A:
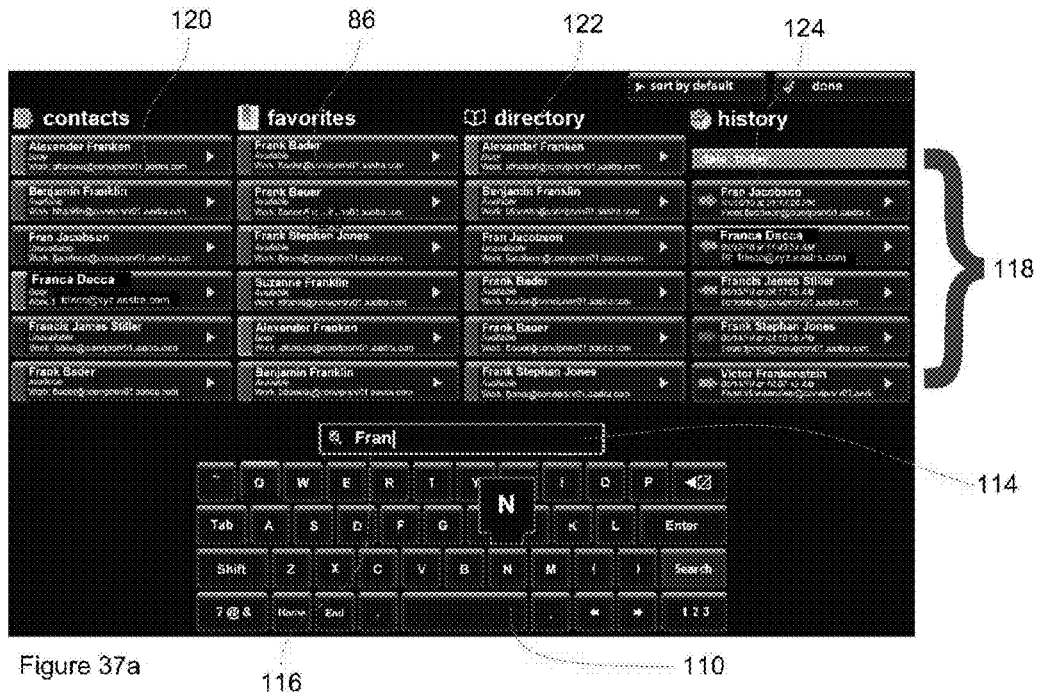
FIGS. 37a to 37g depict an exemplary keyboard for alphanumeric text entry and searching.
Figure 37B:
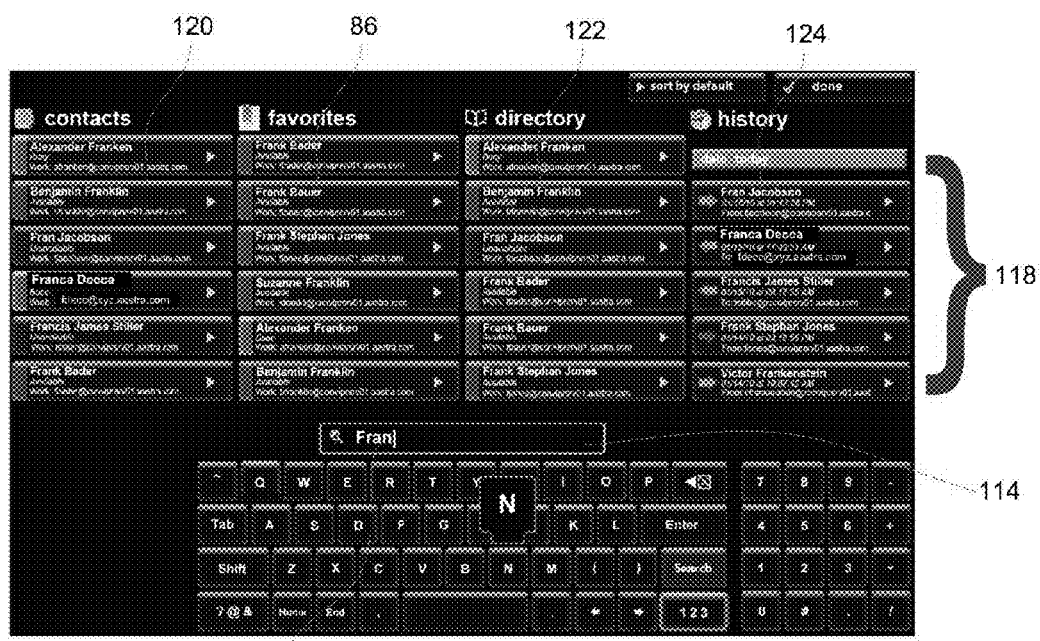
Figure 37C:
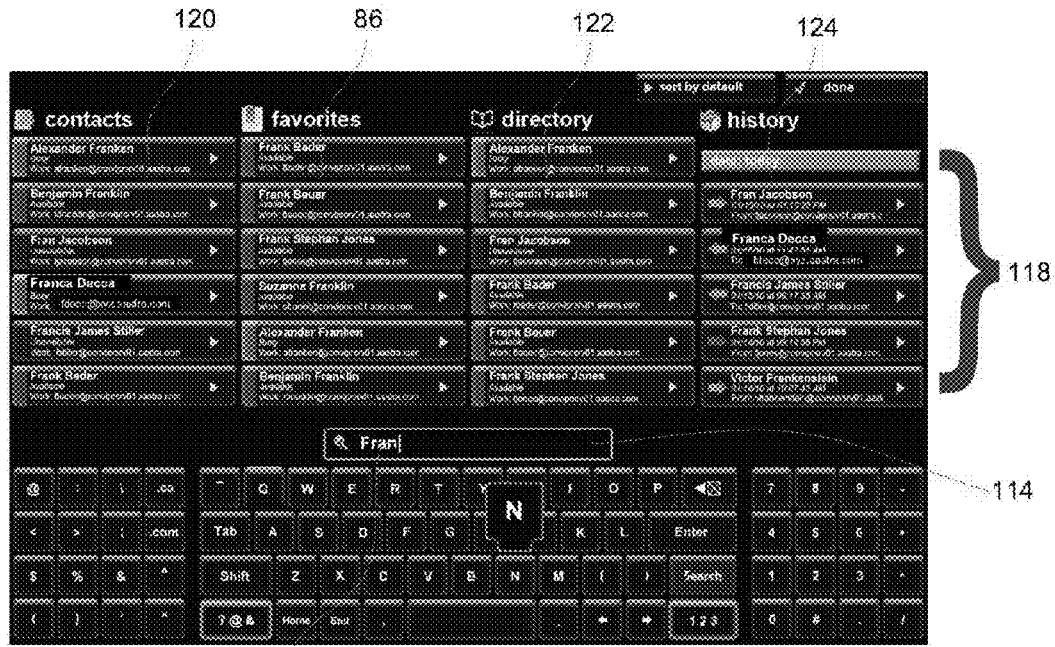
Figure 37D:
Figure 37E:
Figure 37F:
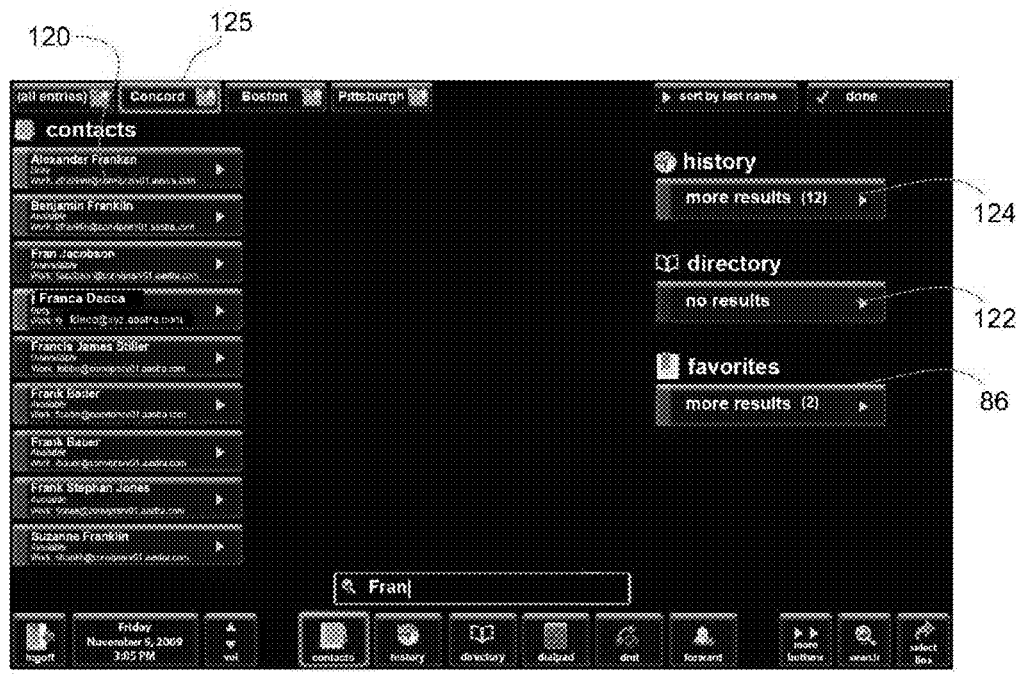
Figure 37G:
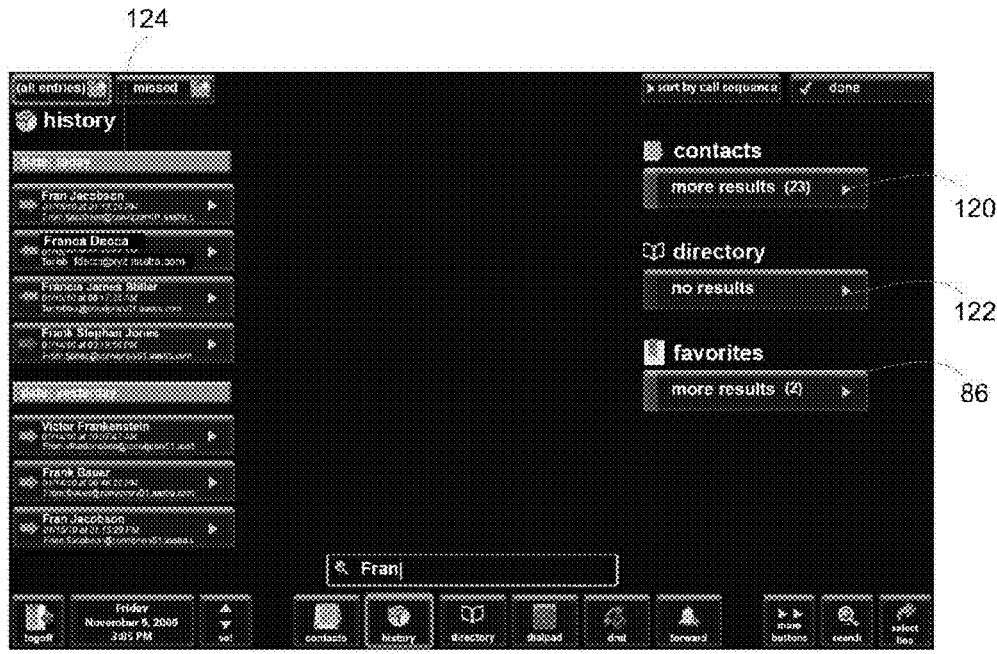

FIGS. 37e to 37g illustrate the flexibility in displaying specific results from individual searchable lists, such as displaying results from only one searchable list (contacts 120), while minimizing all other results from the directory 122, favourites 86, and history 124 lists, as shown in FIG. 38e. Also, the results may also be refined by based on at least one location 125. However, any one of the minimized results from the directory 122, favourites 86, and history 124 lists may be readily expanded by a touch gesture for full display on the GUI display 70, FIG. 37g, while minimizing the other results.

In another exemplary embodiment, the contacts and/or directories are searchable via a speech recognition engine. For example, a user may utter a command: "Call Sam Brown" and the speech recognition engine searches the local contact list stored in memory 27, favourites, or call history, and if there is no match a further search is performed on the LDAP directory on server 21. It is assumed that most frequently called contacts would be available in the local contact list, favourites, or call history, thus obviating any further dialling delay that may be inherent with an LDAP directory search.

Figure 38:
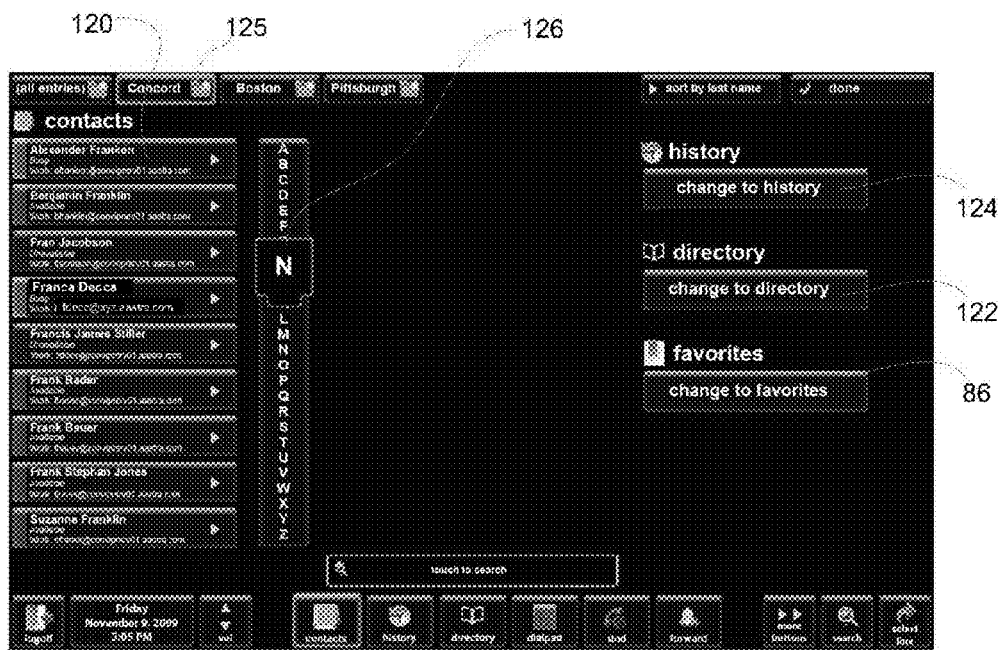
FIG. 38 depicts a multi-tap ROLODEX™ type directory search.

FIG. 38 shows a multi-tap ROLODEX™ type directory search 126, with grouped letters from A to Z, in which a first tap displays entries corresponding to the first letter of the group, while a double tap displays entries corresponding to the second letter of that group, such that N-taps displays entries corresponding to Nth letter of the group. Alternatively, touching the group results in a magnified view of the group such that the user can specify a desired letter from the group.

Figure 39A:
FIGS. 39a and 39b depict details of a selected contact.
Figure 39B:
Figure 40:
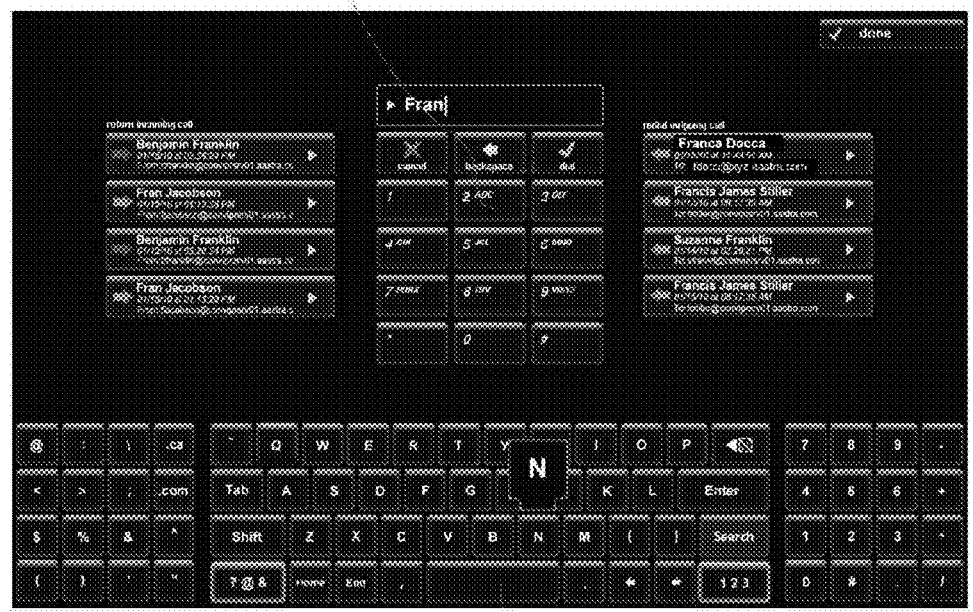
FIG. 40 depicts the results from a search query of received calls, missed calls or dialled calls.

FIGS. 39a to 39b show details of a selected contact. The entries in the contacts and/or directories include an image or icon related to the contact/directory entry. For example, upon initial logon, the face of the user is captured and included in the user's profile of FIG. 39a in a contacts list or LDAP directory in an enterprise environment. Each contact/directory entry may also include presence information or representation, such as green outline or a red outline around the contact's image indicating availability or non-availability, respectively. In FIG. 39b, further editing or data input to the contact is possible via the virtual keyboard 110. FIG. 40 shows the results from a search query of received calls, missed calls or dialled calls using the keyboard 110, including a dial pad 128 for dialling a destination phone number or an IP address.

In another exemplary embodiment, a method of acquiring a snapshot of at least one video frame received by a called party B is disclosed, that is, a calling party A may view an exact facsimile of his/her image captured from a video frame as it is being received by a called party. The captured image is sent to the calling party A in any known image file format, such as, TIFF or PNG. Sending the image back in an image file format, instead of actual video received, ensures proper representation of the called party B's experience, and mitigates against further network effects on the snapshot. The captured image may be compared to the self-view image at the calling party A, whose quality that is not dictated by the communication medium conditions between the calling party and the called party. Such a feature may be used to diagnose network 14 problems or degradation, camera issues, or reception issues related to video at either endpoint 12. As such, the videophone terminal 12 includes a quality of service (QoS) meter for display on the GUI 70 that monitors all network connections on the videophone terminal 12, such as LAN 19 connection or WAN 18 connection, and may measure latency, jitter and delay to assess the health of the network 14. The QoS meter may include real-time displays of uplink and downlink speeds in graphical and numerical forms, including logs, bandwidth usages, and a representative images being received by the called party.

In another exemplary embodiment, party A in conference with at one other party, such as party B, may capture and exchange screenshots or portions thereof, as a means of collaboration. As an example, party A may wish to send party B a portion of a spreadsheet with sales numbers for a particular market, and rather than sending the entire lengthy spreadsheet, party A simply captures the relevant portion and sends it directly to party B. Such a method is advantageous as it is instant, relatively faster than other collaborative ways, and conserves bandwidth. Each party within the conference is associated with a device 12 including a software client module stored in the memory, and having a plurality of program instructions executable by the microprocessor 21, such as a desktop sharing application or a configuration program. The VAS 20 comprises data structures, such as, databases, and acts as a mediator for all collaboration communications between authenticated users on devices 12. The device 12 may include any of a personal computer, laptops, tablet, computer server, computerized kiosk, personal digital assistant (PDA), cellular phone, smartphone, videophone and a desktop media phone.

Figure 41:
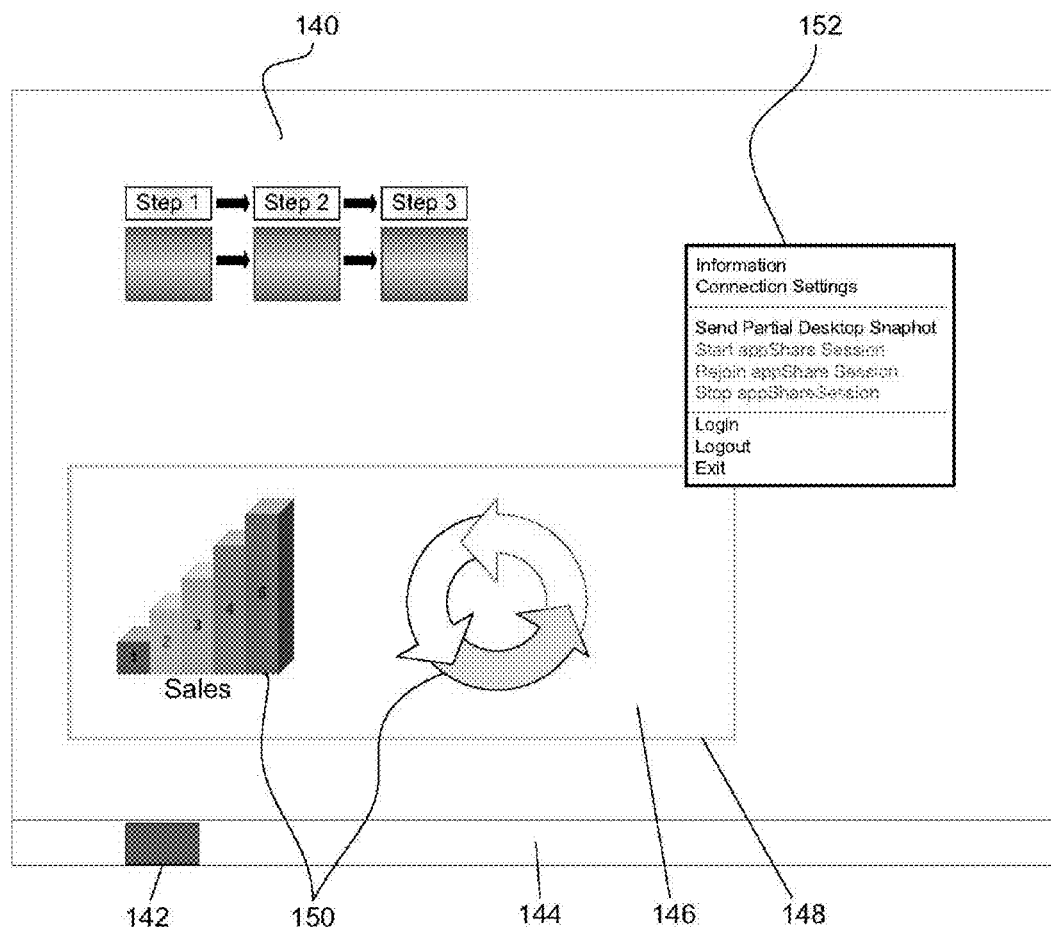
FIG. 41 shows an exemplary desktop with shared content.

Turning to FIG. 41, the device 12 comprises a graphical user interface (GUI) and applications displayed on a screen 140. The GUI includes, but is not limited to, the "desktop" of the operating system, controls such as taskbars and scroll bars, any icons and application windows. The GUI allows information to be presented on devices 12 in windows; and each device 12 runs the desktop sharing application program that permits the devices 12 to share displayed information.

Generally, after the device 12 is first powered on and communicatively coupled to the network 14 via a network interface, a configuration process is initiated by the software client module on device 12, which configures the device 12 in order to participate in the collaboration system 10. As an example, the user is prompted to enter the network address, such as an IP address, of the VAS 20; and the software client module automatically determines whether the identified VAS 20 is reachable. This determination may be implemented via a ping command, as is well known in the art, or by other means. When the VAS 20 is coupled to the network 14 and thus reachable, the VAS 20 requests the user to supply login credentials. In one example, these credentials may be the user's Windows Active Directory user id and password, or network credentials, however, the credentials may be unique to the VAS 20. Accordingly, the step of determining whether the VAS 20 is reachable enhances the user's experience by bypassing unnecessary "failed to login" error messages common when a network connection can not be established.

Alternatively, the software client module automatically initiates a discovery process to find an available VAS 20, and the computing device 10 receives the network address, including any other settings, from the VAS 20, via any suitable transport protocol, such as UDP, TCP, TLS, HTTP (S), FTP, or TFTP, in order to auto-configure the device 12.

After an initial successful login, the user is given the option to permit the software client module to automatically login the user for subsequent conferencing sessions, post device 12 boot-up. Once logged in, the sharing application program is operational, and the associated application window may be minimized to free up GUI real estate, or closed, but the sharing application program continues to run background, and may include an appropriate icon 142 in the display task bar 144.

After all the devices 12 participating in the conferencing session are coupled to the VAS 20, each device 12 may obtain the list of the other devices 12 in the conferencing session from the VAS 20. As shown in FIG. 3, a device 12 may share images of at least a portion of its screen 140, e.g., a window, a region of the screen or the full screen, with other devices 12, via the sharing application. As an example, during an active video conferencing session, a user actuates, via a "right" click, for example, the icon 142 which launches a dialog box comprising a menu with available sharing options. The menu options may be grouped into categories and separated by an appropriate delimiter, such as a horizontal bar. The available sharing options may include, but are not limited to, "Desktop snapshot", "Partial desktop snapshot", and "Share desktop".

In one example, selecting the "Partial Desktop Snapshot" option creates a sharing window 146 bounded by a window frame 148 on the user's desktop 140. To enhance usability, the sharing window 146 may be substantially opaque to help the user distinguish between the desktop 140 and the windowed area 146. The sharing window 146 and window frame 148 may be moved to any location on the desktop 140 having content 150 for sharing. As an example, the window frame 148 may be moved by left clicking anywhere within the framed window 146, and dragging the framed window 146 to another location while pressing the left mouse button. The framed window 146 may be resized by left clicking appropriate resize bars, and dragging to an alternate size while pressing the left mouse button. The user can also expand the framed window 146 to full size by left clicking an appropriate expansion icon. Having determined the desired content 150 for sharing, the user overlays the suitably dimensioned framed window 146 over the desired content 150 for sharing, and selects "take snapshot" to capture the content 150. Such an action may include visual or audible indicators to confirm the capture event. As an example, the window frame 148 may include a momentary color change, such as a red window frame 148, and/or an audible camera shutter sound may be used confirm that an image of the framed window 146 has been captured. Alternatively, should the user decide not to capture the content 150, closing the framed window 146 cancels the selection.

Once the content 150 has been captured, another dialog box 152 with a plurality of options is presented prompting the user for an action. One of the options may be sending the captured content 150 to other conference participants. Accordingly, the user may select the option to send the captured content 150 in framed window 146 and a single image of the captured content 150 is automatically sent to all conference participants via a messaging application integrated with the sharing application and VAS 20. As such, there is no requirement on the user's part to specify recipients. Alternatively, the user may select to capture and send a sequence of images.

In another example, selecting the "Desktop Snapshot" option sends a single image of the user's entire desktop 140 to all conference participants. A momentary flash of a red border around the desktop 140, and/or an audible camera shutter sound may also be used confirm that an image of the desktop 140 has been captured. The image is subsequently sent to all conference participants automatically, without the user having to specify recipients.

In yet another example, the desktop 140 may be automatically captured periodically based on a user defined timer, or based upon changes to the user's desktop, and the captured images are also sent periodically in real-time. Using this option, a user may share a slide presentation, without having to manually capture and send each newly captured image. In this mode, a visual indicator may still be provided, however, the audio indicator may be muted, as the sound may distract the user, or interfere with the user's verbal presentation. Correspondingly, the visual indicator may be implemented in such a way that it fades in and out with each image capture, such that any captured images sent to the other participants do not include the visual indicator.

In the above examples, the captured images are processed by the device 12 and sent either to the VAS 20 for distribution, or sent directly to the other participants. The processing of the captured images may involve graphic manipulation of color depth, resolution and aspect ratio. To conserve bandwidth and reduce transmission time, the processed images may also be compressed, using lossy or lossless techniques, before being sent to their destination. However, some of the processing may be performed by the VAS 20 in the VAS distribution model.

In yet another example, after the image capture, the participant may be prompted to choose specific recipients or a distribution list, rather than sending the captured images to all conference participants.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The features described herein can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

The preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. An apparatus for facilitating a video communication session between at least two correspondents, each correspondent being associated with said apparatus having a graphical user interface (GUI), said apparatus comprising a non-transitory machine readable medium comprising instructions stored thereon and executable by a processor to cause said processor to:
   display video corresponding to at least one of said correspondents in a first partition, wherein the video has characteristics;
   execute a plurality of application programs concurrently in a second partition;
   display said plurality of application programs in said second partition;
   display GUI objects corresponding to said video communication session in a third partition; and
   dynamically resize said second partition to a size that depends on the characteristics of said video.

2. The apparatus of claim 1 wherein said graphical user interface is touch sensitive.

3. The apparatus of claim 2 wherein said first and second partitions are scaled depending upon the characteristics of the application programs executing concurrently during said video communication session.

4. The apparatus of claim 3 wherein said first and second partitions are scaled by at least one of a control GUI object and a predetermined touch gesture.

5. The apparatus of claim 4 wherein said GUI objects comprise at least one of a button, dialog box, pop-up window, pull-down menu, icon, scroll bar, resizable window edge, progress indicator, selection box, windows, tear-off menu, menu bar, toggle switch, forms, image, text, video, widget, and any combination thereof.

6. The apparatus of claim 5 wherein said second scalable partition comprises subsets of GUI objects corresponding to application programs, wherein each of said subsets pertains to a particular theme.

7. The apparatus of claim 6 wherein said subsets of GUI objects are user defined.

8. The apparatus of claim 6 wherein said subsets of GUI objects are defined automatically.

9. The apparatus of claim 8 wherein said second scalable partition displays at least one selected application program associated with said one of said GUI objects.

10. The apparatus of claim 8 wherein said GUI displays said at least two correspondents in said first scalable partition and said second scalable partition.

11. The apparatus of claim 9 wherein said second scalable partition displays a first set of GUI objects associated with application programs following actuation of at least one control GUI object.

12. The apparatus of claim 10 wherein said GUI objects in said third partition are arranged in subsets corresponding to various states of said video communication session.

13. The apparatus of claim 12 wherein said various states pertain to one of an active call state, an idle call state and a passive call state.

14. A non-transitory machine readable medium comprising instructions stored thereon and executable by a processor to cause said processor to initiate a video communication session between at least two correspondents, each correspondent being associated with an apparatus with a graphical user interface (GUI);

display video corresponding to at least one of said correspondents in a first dynamically scalable partition, wherein the video has characteristics;

execute a plurality of application programs concurrently in a second dynamically scalable partition;

display said plurality of application programs in said second dynamically scalable partition;

display a second set of GUI objects corresponding to said video communication session in a dynamically scalable third partition; and dynamically resize said second partition to a size that depends on the characteristics of said video.

15. The non-transitory machine readable medium of claim 14 wherein said second set of GUI objects in said third partition arranged in subsets corresponding to various states of said video communication session.

16. The non-transitory machine readable medium of claim 15 wherein said second set of GUI objects are control buttons comprising at least one of select line, search, logoff, contacts, call history, contact information history, directory, dialpad, dnd, forward, voice only, mic, mute, speaker, headset, saved conferences, hold, transfer, add party, save conference, moderator, participants, and conference format.

* * * * *